United States Patent
Wang et al.

(10) Patent No.: US 11,457,135 B2
(45) Date of Patent: Sep. 27, 2022

(54) CAMERA UNIT WITH LIGHT STEERING MECHANISM AND THE APPLICATION THEREOF

(71) Applicant: NINGBO SUNNY OPOTECH CO., LTD., Zhejiang (CN)

(72) Inventors: Mingzhu Wang, Zhejiang (CN); Yinli Fang, Zhejiang (CN); Lifeng Yao, Zhejiang (CN); Ang Ji, Zhejiang (CN); Yurong Wu, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

(21) Appl. No.: 17/251,347

(22) PCT Filed: Jun. 6, 2019

(86) PCT No.: PCT/CN2019/090368
§ 371 (c)(1),
(2) Date: Dec. 11, 2020

(87) PCT Pub. No.: WO2019/237993
PCT Pub. Date: Dec. 19, 2019

(65) Prior Publication Data
US 2021/0281723 A1    Sep. 9, 2021

(30) Foreign Application Priority Data

Jun. 12, 2018 (CN) .......................... 201810601727.3
Jun. 12, 2018 (CN) .......................... 201820909456.3

(51) Int. Cl.
*H04N 5/262* (2006.01)
*H04N 5/225* (2006.01)
*H04M 1/02* (2006.01)

(52) U.S. Cl.
CPC ........ *H04N 5/2254* (2013.01); *H04M 1/0264* (2013.01); *H04N 5/2258* (2013.01)

(58) Field of Classification Search
CPC .................................................. H04N 5/2258
See application file for complete search history.

(56) References Cited

U.S. PATENT DOCUMENTS 10,509,209 B2 * 12/2019 Shabtay .................. G02B 13/04
11,262,559 B2 *  3/2022 Shabtay ............... H04N 5/2254
(Continued)

FOREIGN PATENT DOCUMENTS

| CN | 103513412 | 1/2014 |
| CN | 105527702 | 4/2016 |

(Continued)

OTHER PUBLICATIONS

Extended European Search Report dated Aug. 2, 2021 in corresponding European Patent Application No. EP 19820400.0.
(Continued)

*Primary Examiner* — Gary C Vieaux
(74) *Attorney, Agent, or Firm* — Wenderoth, Lind & Ponack, L.L.P.

(57) ABSTRACT

The present invention provides a camera unit with a light steering mechanism and application thereof, wherein the camera unit includes a long-focal-length camera module and a wide-angle camera module, wherein the wide-angle camera module provides a wide-angle image, and a ratio between an equivalent focal length of the long-focal-length camera module and an equivalent focal length of the wide-angle camera module is not less than 4, wherein the long-focal-length camera module includes a light steering mechanism, a long-focal-length lens and a long-focal-length photosensitive assembly, wherein the light steering mechanism is used for turning the light to pass through the (Continued)

long-focal-length lens to be received by the long-focal-length photosensitive assembly, wherein a height dimension of the long-focal-length camera module does not exceed 5.6 mm.

15 Claims, 10 Drawing Sheets

(56) References Cited

U.S. PATENT DOCUMENTS

| | | | |
|---|---|---|---|
| 2006/0132644 A1* | 6/2006 | Shangguan | H04N 5/2257 348/374 |
| 2006/0221225 A1* | 10/2006 | Tsukamoto | H01L 27/14618 348/340 |
| 2011/0051243 A1 | 3/2011 | Su | |
| 2015/0253647 A1* | 9/2015 | Mercado | G02B 13/002 348/373 |
| 2015/0286033 A1 | 10/2015 | Osborne | |
| 2016/0161733 A1 | 6/2016 | Li | |
| 2018/0024329 A1* | 1/2018 | Goldenberg | G02B 27/646 359/557 |
| 2018/0095253 A1* | 4/2018 | Shabtay | G02B 13/02 |
| 2018/0120674 A1* | 5/2018 | Avivi | G02B 27/64 |
| 2018/0152640 A1 | 5/2018 | Shabtay et al. | |
| 2019/0258033 A1* | 8/2019 | Shabtay | H04N 5/2253 |
| 2021/0048649 A1* | 2/2021 | Goldenberg | G02B 13/0065 |
| 2021/0103131 A1* | 4/2021 | Shabtay | G02B 13/04 |

FOREIGN PATENT DOCUMENTS

| | | | |
|---|---|---|---|
| CN | 205942054 | 2/2017 | |
| CN | 206042066 | 3/2017 | |
| CN | 206421098 | 8/2017 | |
| CN | 107515459 | 12/2017 | |
| CN | 107659758 | 2/2018 | |
| CN | 206960757 | 2/2018 | |
| CN | 208609064 | 3/2019 | |
| TW | 201207426 | 2/2012 | |
| WO | WO-2018035945 A1 * | 3/2018 | G02B 7/18 |

OTHER PUBLICATIONS

Translation of International Search Report dated Aug. 27, 2019 in International (PCT) Application No. PCT/CN2019/090368.

* cited by examiner

CAMERA UNIT WITH LIGHT STEERING MECHANISM AND THE APPLICATION THEREOF

FIELD OF THE INVENTION

The present invention relates to zoom field of dual camera modules, in particular to a camera unit with a light steering mechanism and application thereof.

BACKGROUND OF THE INVENTION

At present, zoom of a dual camera module relies on a difference between physical focal lengths of a wide-angle lens and a long-focal-length lens to achieve a "wide-angle" or "long-focal-length" shooting effect.

Since a height of the long-focal-length lens is higher than that of the wide-angle lens, there is a height difference between them. When a higher zoom magnification is required, the height of the long-focal-length lens will be designed to be higher so that a ration of the focal length of the long-focal-length lens and the focal length of the wide-angle lens is greater. This brings problems to assembly, especially in today's pursuit of thin and light electronic devices.

In order to solve this problem, some manufacturers design the camera module with the long-focal-length lens as a periscope camera module. The periscope camera module has a light steering mechanism, so that the light turns 90 degrees and then passes through an optical lens to be received by a photosensitive element to form an image. The photosensitive element, the optical lens, and the light steering element are arranged along the width direction of the electronic device, and the light reflected by the object perpendicular to the width direction of the electronic device is turned 90 degrees by the light steering element and then passes through the optical lens along the width direction of the electronic device to be received by the photosensitive element to form an image, the height of the periscope camera module with the long-focal-length lens is effectively reduced in this way.

However, as demand for zoom magnification increases, the focal length of the periscope camera module with the long-focal-length lens needs to be increased. Accordingly, a dimension of the long-focal-length lens needs to be increased. Therefore, how to increase the focal length of the long-focal-length lens while ensuring that the size of the periscope camera module with the long-focal-length lens is not increased or even optimized is an urgent problem to be solved.

SUMMARY OF THE INVENTION

An object of the present invention is to provide a camera unit with a light steering mechanism and application thereof, wherein the camera unit includes at least one wide-angle camera module and a long-focal-length camera module with a light steering mechanism, a dimension of the long-focal-length camera module can be effectively reduced, so that the camera unit is particularly suitable for being applied to electronic devices pursuing lightness and thinness.

Another object of the present invention is to provide a camera unit with a light steering mechanism and application thereof, wherein a height dimension of the long-focal-length camera module can be effectively reduced, so that the camera unit is particularly suitable for being applied to electronic devices pursuing lightness and thinness.

Another object of the present invention is to provide a camera unit with a light steering mechanism and application thereof, wherein the height dimension of the long-focal-length camera module of the dual camera module can be reduced while ensuring a zoom magnification of the entire camera unit, so as to have a better zoom capability while being suitable for thin and light electronic devices.

Another object of the present invention is to provide a camera unit with a light steering mechanism and application thereof, wherein heights of the long-focal-length camera module and the wide-angle camera module are not more than 5.6 mm, and the zoom magnification of the long-focal-length camera module and the wide-angle camera module is not less than 4 times.

Another object of the present invention is to provide a camera unit with a light steering mechanism and application thereof, wherein the long-focal-length camera module provides a long-focal-length lens, a light steering mechanism and a photosensitive assembly, the light steering mechanism is capable of turning light to pass through the long-focal-length lens to be received by the long-focal-length photosensitive element for imaging.

Another object of the present invention is to provide a camera unit with a light steering mechanism and application thereof, wherein the height dimension of the long-focal-length photosensitive assembly can be effectively reduced by reducing the number of photosensitive units of the photosensitive element.

Another object of the present invention is to provide a camera unit with a light steering mechanism and application thereof, wherein the long-focal-length photosensitive assembly provides a base, a photosensitive element and a circuit board, wherein the base is integrally formed on the photosensitive element and the circuit board to effectively reduce the height dimension of the long-focal-length photosensitive assembly.

Another object of the present invention is to provide a camera unit with a light steering mechanism and application thereof, wherein the height dimension of the long-focal-length lens can be effectively reduced by reducing diameter of the lens.

Another object of the present invention is to provide a camera unit with a light steering mechanism and application thereof, wherein the light steering mechanism provides a prism made of resin material, and a lightweight design of the prism is beneficial to reduce the dimension of the long-focal-length camera module.

Another object of the present invention is to provide a camera unit with a light steering mechanism and application thereof, wherein the camera unit is designed with a smaller dimension, and the photosensitive performance of the long-focal-length camera module can be enhanced.

According to an aspect of the present invention, a camera unit with a light steering mechanism is provided, including:

a long-focal-length camera module and a wide-angle camera module, wherein the wide-angle camera module provides a wide-angle image, and a ratio between an equivalent focal length of the long-focal-length camera module and an equivalent focal length of the wide-angle camera module is not less than 4, wherein the long-focal-length camera module includes a light steering mechanism, a long-focal-length lens and a long-focal-length photosensitive assembly, wherein the light steering mechanism is used for turning the light to pass through the long-focal-length lens to be received by the long-focal-length photosensitive assembly, wherein a height dimension of the long-focal-length camera module does not exceed 5.6 mm, wherein a first surface of the long-focal-length lens has a first height h, and a diagonal length of a photosensitive area of a photosensitive element of the long-focal-length photosensitive assembly is L, wherein the h and L satisfy the following conditions:

$h/L \geq 0.8$.

According to an embodiment of the present invention, the ratio between the equivalent focal length of the long-focal-length camera module and the equivalent focal length of the wide-angle camera module is not less than 5.

According to an embodiment of the present invention, the h and the L respectively satisfy the following conditions:

5.1 mm≥h≥4.7 mm, L≤5.5 mm.

According to an embodiment of the present invention, a range of the equivalent focal length of the long-focal-length camera module is 80 mm~160 mm, and a range of the equivalent focal length of the wide-angle camera module is 20 mm~40 mm.

According to an embodiment of the present invention, the height dimension of the camera unit does not exceed 5.6 mm.

According to an embodiment of the present invention, the photosensitive element includes a plurality of photosensitive units, and light is received by the photosensitive element after passing through the long-focal-length lens, wherein a dimension A of a single photosensitive unit is ≥1.2 μm, wherein a diameter D of an aperture of the long-focal-length lens satisfies the following conditions:

3.76 mm≤D≤5.3 mm.

According to an embodiment of the present invention, the long-focal-length photosensitive assembly further includes a base and a circuit board, wherein the base is integrally formed on the photosensitive element and the circuit board.

According to an embodiment of the present invention, the circuit board includes a substrate and a plurality of electronic components, wherein the electronic components are provided on a Y-axis direction of the substrate.

According to an embodiment of the present invention, the light steering mechanism has an incident plane, a reflective plane, and an exit plane, wherein the incident plane allows light to enter, and the light reflected by the reflective plane enters the long-focal-length lens through the exit plane, wherein an angle between the reflective plane and the exit plane does not exceed 45°.

According to an embodiment of the present invention, the light steering mechanism includes a prism, wherein the prism is made of resin material.

According to an embodiment of the present invention, the long-focal-length lens includes a light-transmitting element group and a supporting element, wherein the light-transmitting element group is accommodated in the supporting element, wherein a radial dimension of the supporting element in a Z-axis direction is lower than a radial dimension in a Y-axis direction.

According to an embodiment of the present invention, the long-focal-length lens includes a light-transmitting element group and a supporting element, wherein the light-transmitting element group is supported on the supporting element, and the light-transmitting element group is exposed outside the supporting element in a Z-axis direction.

According to another aspect of the present invention, a mobile electronic device is provided, including:

an electronic device body and the camera unit according to any one of above-described, wherein the camera unit is communicably connected to the electronic device body.

According to an embodiment of the present invention, the electronic device body includes a processing unit and a display unit, wherein the processing unit is communicably connected to the display unit, and the camera unit is operatively connected to the processing unit.

According to another aspect of the present invention, a camera unit with a light steering mechanism is provided, including:

a long-focal-length camera module and a wide-angle camera module, wherein the wide-angle camera module provides a wide-angle image, wherein a ratio between an equivalent focal length of the long-focal-length camera module and an equivalent focal length of the wide-angle camera module is not less than 4, wherein the long-focal-length camera module includes a light steering mechanism, a long-focal-length lens and a long-focal-length photosensitive assembly, wherein the light steering mechanism is used for turning the light to pass through the long-focal-length lens to be received by the long-focal-length photosensitive assembly for imaging, wherein a height dimension of the long-focal-length camera module does not exceed 5.6 mm, wherein a dimension of a photosensitive unit of a photosensitive element of the long-focal-length photosensitive assembly is A, and a diameter of an aperture of the long-focal-length lens is D, wherein A and D meet the following conditions:

a value of a product of A and D is ≥4.4, wherein the unit of A is μm and the unit of D is mm. According to an embodiment of the present invention, the ratio between the equivalent focal length of the long-focal-length camera module and the equivalent focal length of the wide-angle camera module is not less than 5.

According to an embodiment of the present invention, the h and the L respectively satisfy the following conditions:

5.1 mm≥h≥4.7 mm, L≤5.5 mm.

According to an embodiment of the present invention, a range of the equivalent focal length of the long-focal-length camera module is 80 mm~160 mm, and a range of the equivalent focal length of the wide-angle camera module is 20 mm~40 mm.

According to an embodiment of the present invention, a height dimension of the camera unit does not exceed 5.6 mm.

According to an embodiment of the present invention, the photosensitive element includes a plurality of photosensitive units, and the light is received by the photosensitive element after passing through the long-focal-length lens, wherein a dimension A of a single photosensitive unit is ≥1.2 μm, wherein the diameter D of the aperture satisfies the condition:

3.76 mm≤D≤5.3 mm.

According to an embodiment of the present invention, the long-focal-length photosensitive assembly further includes a base and a circuit board, wherein the base is integrally formed on the photosensitive element and the circuit board.

According to an embodiment of the present invention, the circuit board includes a substrate and a plurality of electronic components, wherein the electronic components are provided on a Y-axis direction of the substrate.

According to an embodiment of the present invention, the light steering mechanism has an incident plane, a reflective plane, and an exit plane, wherein the incident plane allows light to enter, and the light reflected by the reflective plane enters the long-focal-length lens through the exit plane, wherein an angle between the reflective plane and the exit plane does not exceed 45°.

According to an embodiment of the present invention, the light steering mechanism includes a prism, wherein the prism is made of resin material.

According to an embodiment of the present invention, the long-focal-length lens includes a light-transmitting element group and a supporting element, wherein the light-transmitting element group is accommodated in the supporting element, wherein a radial dimension of the supporting element in a Z-axis direction is lower than a radial dimension in a Y-axis direction.

According to an embodiment of the present invention, the long-focal-length lens includes a light-transmitting element group and a supporting element, wherein the light-transmitting element group is supported on the supporting element, and the light-transmitting element group is exposed outside the supporting element in a Z-axis direction.

According to another aspect of the present invention, a mobile electronic device is provided, including:

an electronic device body and the camera unit according to any one of the above-described, wherein the camera unit is communicably connected to the electronic device body.

According to an embodiment of the present invention, the electronic device body includes a processing unit and a display unit, wherein the processing unit is communicably connected to the display unit, and the camera unit is operatively connected to the processing unit.

According to another aspect of the present invention, a method for manufacturing a camera unit is provided, it includes the following steps:

providing a long-focal-length camera module with a height not exceeding 5.6 mm and a wide-angle camera module, wherein a ratio of equivalent focal lengths of the long-focal-length camera module and the wide-angle camera module is not less than 4; and assembling the long-focal-length camera module and the wide-angle camera module to form a camera unit.

According to an embodiment of the present invention, in the above method, the long-focal-length camera module includes a light steering mechanism, a long-focal-length lens and a long-focal-length photosensitive assembly, wherein the light steering mechanism is used for turning the light to pass through the long-focal-length lens to be received by the long-focal-length photosensitive assembly for imaging, wherein a first surface of the long-focal-length lens has a first height h, and a diagonal length of a photosensitive area of a photosensitive element of the long-focal-length photosensitive assembly is L, wherein the h and L satisfy the following conditions:

$h/L \geq 0.8$.

According to an embodiment of the present invention, in the above method, the long-focal-length camera module includes a light steering mechanism, a long-focal-length lens and a long-focal-length photosensitive assembly, wherein the light steering mechanism is used for turing the light to pass through the long-focal-length lens to be received by the long-focal-length photosensitive assembly for imaging, wherein a height dimension of the long-focal-length camera module does not exceed 5.6 mm, and a dimension of a photosensitive unit of a photosensitive element of the long-focal-length photosensitive assemblys is A, and a diameter of an aperture of the long-focal-length lens is D, wherein A and D satisfy the following conditions:

a value of a product of A and D is $\geq 4.4$, wherein the unit of A is μm and the unit of D is mm.

DETAIL DESCRIPTION OF THE INVENTION

Figure 1:
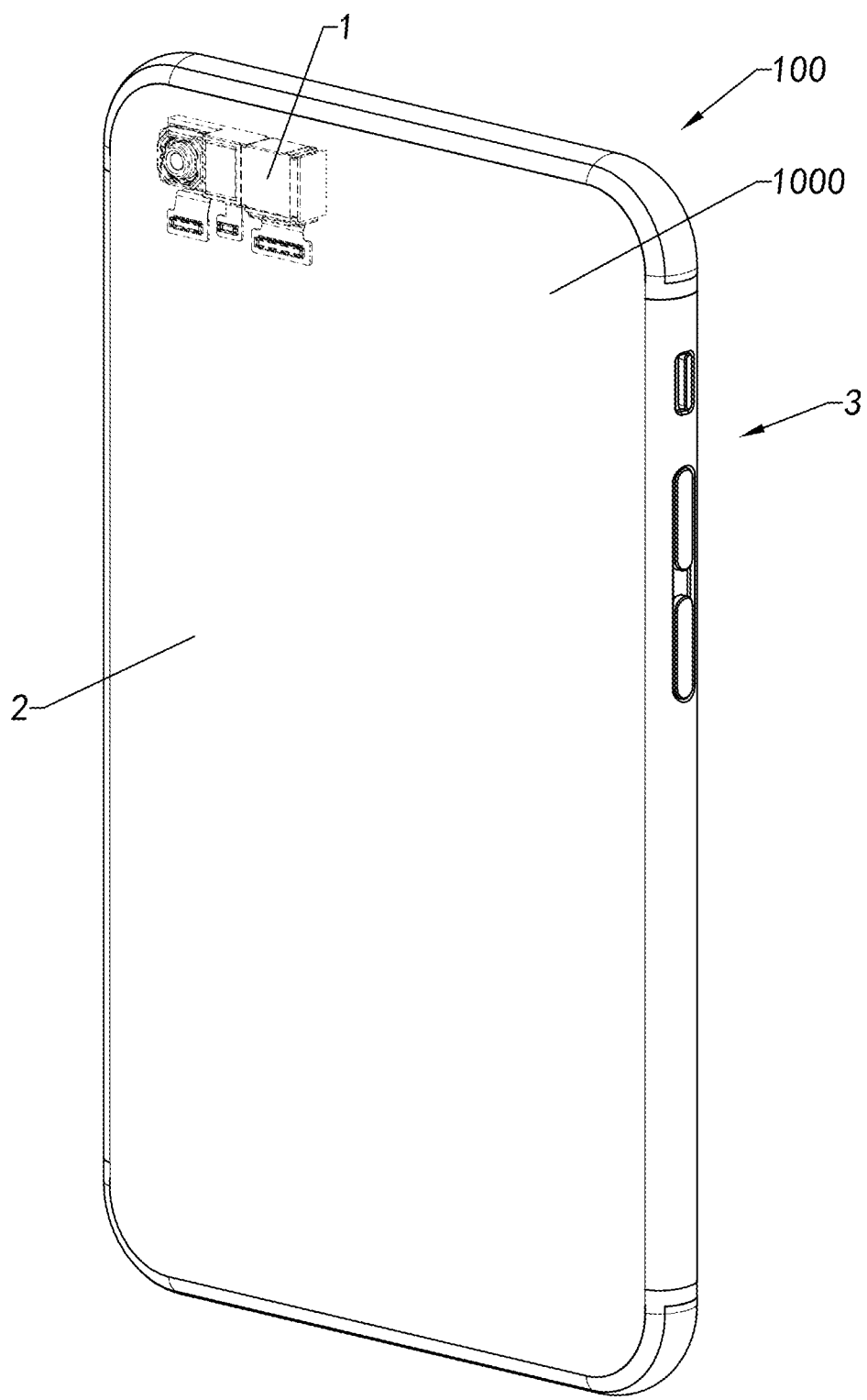
FIG. 1 is a three-dimensional schematic diagram of an electronic device according to a preferred embodiment of the present invention.
Figure 2:
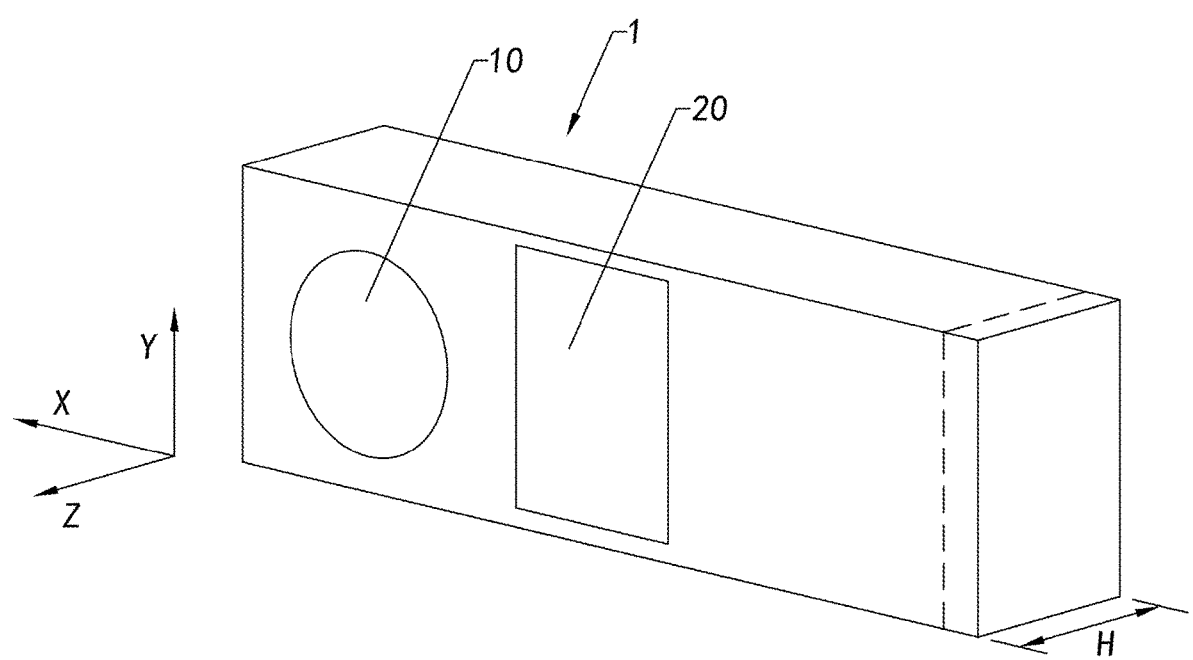
FIG. 2 is a three-dimensional schematic diagram of a camera unit according to a preferred embodiment of the present invention.
Figure 3:
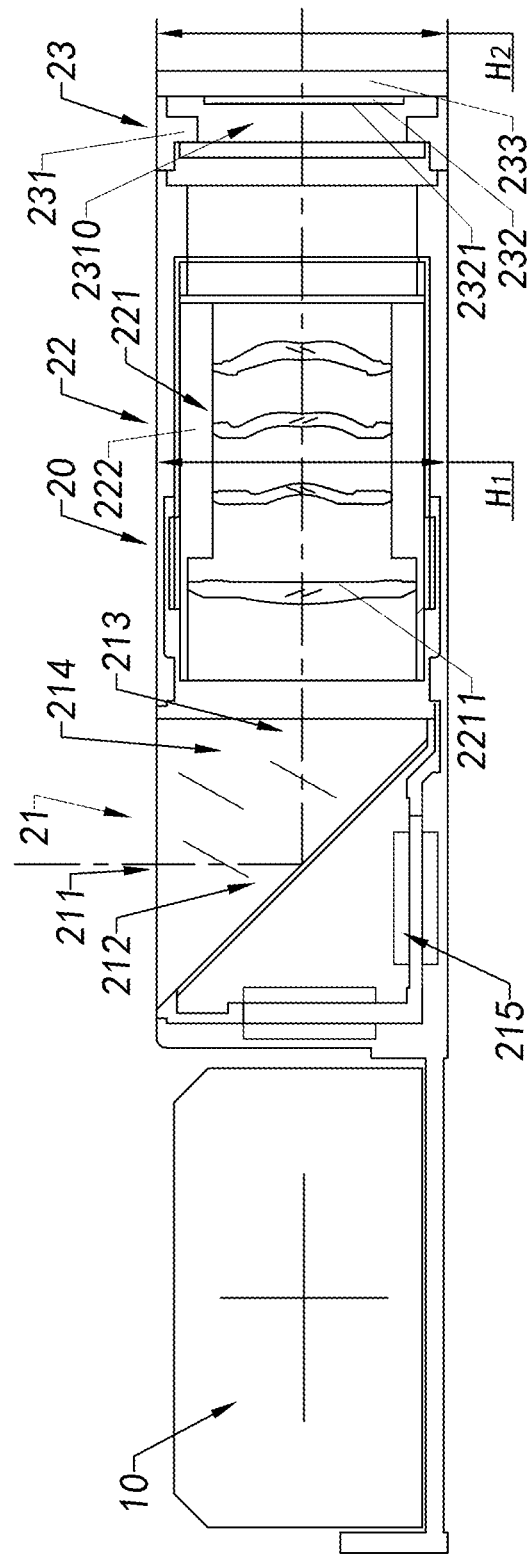
FIG. 3 is a schematic cross-sectional view of a camera unit according to a preferred embodiment of the present invention.

The following description is used to disclose the present invention so that those skilled in the art can implement the present invention. The preferred embodiments in the following description are only for illustration, and those skilled in the art can think of other obvious variations. The basic principles of the present invention defined in the following description can be applied to other embodiments, modifications, improvements, equivalents, and other technical solutions that do not depart from the spirit and scope of the present invention.

Those skilled in the art should understand that, in the disclosure of the present invention, the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, which is only for the convenience of describing the present invention and to simplify the description, rather than indicating or implying that the device or element referred to must have a specific orientation, be constructed and operated in a specific orientation, so the above terms should not be understood as limiting the present invention.

It can be understood that the term "a" should be understood as "at least one" or "one or more", that is, in one embodiment, the number of an element may be one, while in other embodiments, the number can be more than one, and the term "one" cannot be understood as a restriction on the number.

Referring to FIG. 1 to FIG. 5A and FIG. 5B and FIG. 5C, a camera unit 1 according to a preferred embodiment of the present invention and an electronic device 100 using the camera unit 1 are illustrated.

The electronic device 100 includes an electronic device main body 1000 and a camera unit 1, wherein the camera unit 1 is provided on the electronic device main body 1000 for acquiring an image of a photographed object, wherein the camera unit 1 includes a wide-angle camera module 10 and a long-focal-length camera module 20, wherein the wide-angle camera module 10 and the long-focal-length camera module 20 can work together to utilize different physical focal lengths of the wide-angle camera module 10 and the long-focal-length camera module 20 to realize a "wide-angle" or "long-focal-length" shooting effect. An equivalent focal length of the long-focal-length camera module 20 is greater than an equivalent focal length of the wide-angle camera module 10.

The electronic device body 1000 includes a processing unit 2 and a display unit 3, wherein the processing unit 2 is communicably connected to the display unit 3, and the camera unit 1 is operatively connected to the processing unit 2.

The processing unit 2 is electrically connected to the display unit 3 and the processing unit 2 is operatively connected to the camera unit 1. The processing unit 2 is pre-stored with software algorithms to precisely control the wide-angle camera module 10 and the long-focal-length camera module 20 of the camera unit 1. Preferably, the display unit 3 is a touch screen, and by using the display unit 3, the user can directly interact with the camera unit 1, that is, control an operation of the camera unit 1. Image information of the object collected by the camera unit 1 can be directly displayed on the display unit 3.

It is worth noting that an optical zoom of the camera unit 1 does not need to change the focal lengths of the wide-angle camera module 10 and the long-focal-length camera module 20, but instead, uses the wide-angle camera module 10 and the long-focal-length camera module 20 to obtain different information of the object, and the two cooperate with each other, and in the process of shooting the object, an overall zooming of the camera unit 1 is realized through the switching of the wide-angle camera module 10 and the long-focal-length camera module 20 and the software algorithm stored in the processing unit 2, which means that the camera unit 1 does not need to reserve space for movement, so the dimension of the camera unit 1 itself can be smaller.

The wide-angle camera module 10 includes a wide-angle lens and the wide-angle lens has a central axis. The long-focal-length camera module 20 includes a light steering mechanism 21, a long-focal-length lens 22, and a long-focal-length photosensitive assembly 23, wherein the light steering mechanism 21 is capable of turning light from an object or an subject to pass through the long-focal-length lens 22 to be received by the long-focal-length photosensitive assembly 23 for photoelectric conversion.

This embodiment provides the camera unit 1 of a smaller dimension, so that the camera unit 1 is suitable for a lighter and thinner electronic device 100, such as a mobile phone, so that the dimension of the camera unit 1 is suitable for the electronic device body 1000. Preferably, the camera unit 1 does not protrude from the electronic device body 1000 to make the entire electronic device 100 more beautiful. In other words, the camera unit 1 is designed to have a small height H, and the height of the camera unit 1 here refers to an extension height of the camera unit 1 in the Z-axis direction in the figure.

In the wide-angle camera module 10 and the long-focal-length camera module 20, the long-focal-length camera module 20 makes a greater contribution to the height of the entire camera unit 1 than the wide-angle camera module 10. In other words, the height of the long-focal-length camera module 20 limits development of the entire camera unit 1 toward a small dimension.

The dimension of the light steering mechanism 21, the dimension of the long-focal-length lens 22 and the long-focal-length photosensitive assembly 23 of the long-focal-length camera module 20, especially the height dimension, respectively limit the reduction of the height dimension of the entire long-focal-length camera module 20.

A long-focal-length camera module 20 is disclosed herein. The components of the long-focal-length camera module 20 are designed to have a smaller dimension so that the entire long-focal-length camera module 20 has a smaller height dimension. It's worth mentioning that the camera unit 1 can ensure that there is a larger zoom ratio between the wide-angle camera module 10 and the long-focal-length camera module 20 while the height dimension of the long-focal-length camera module 20 is reduced, so that the camera unit 1 has a more prominent zoom performance at the same time.

Figure 4A:
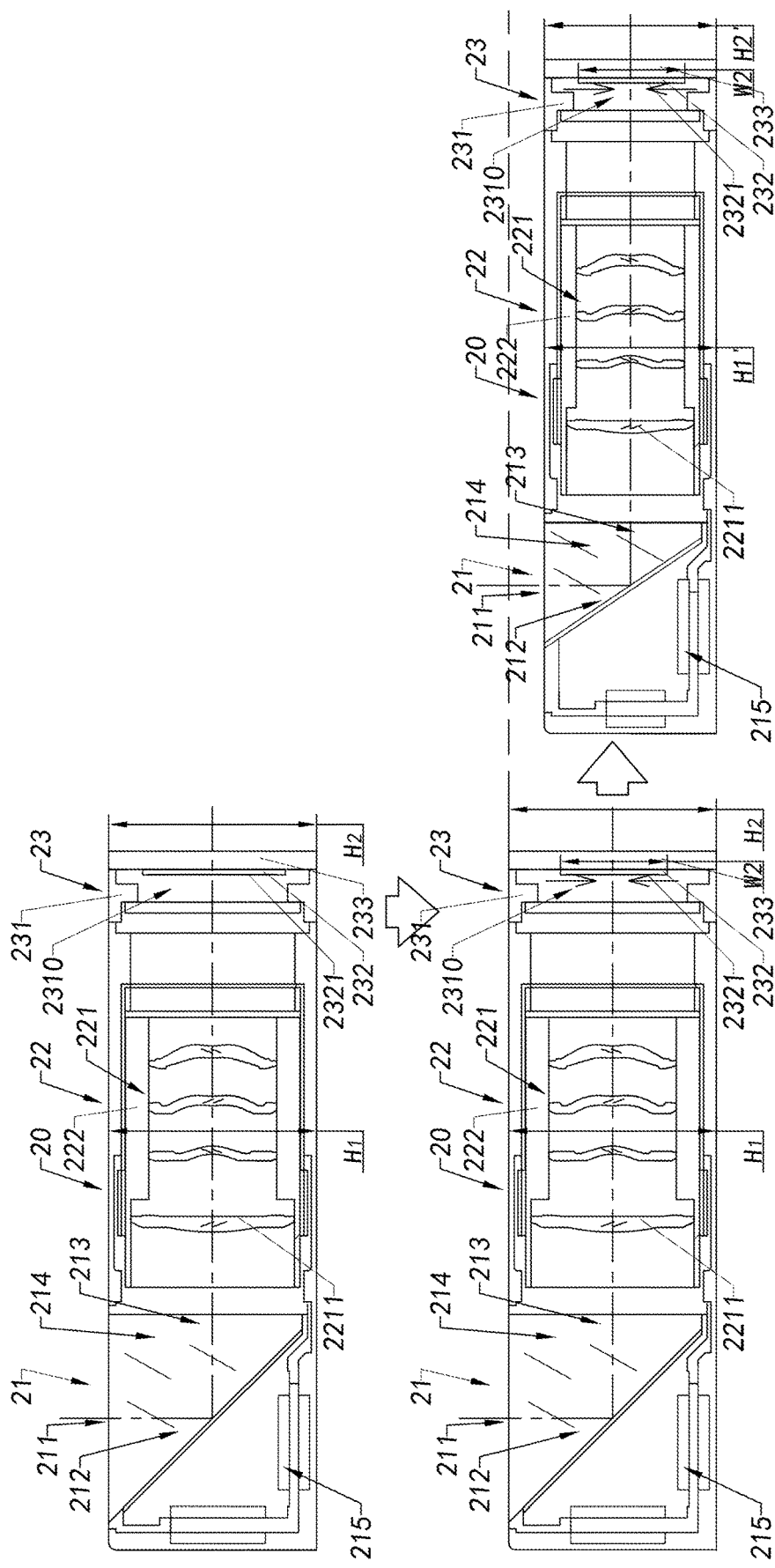
FIG. 4A is a schematic diagram of a long-focal-length camera module according to a preferred embodiment of the present invention.
Figure 4B:
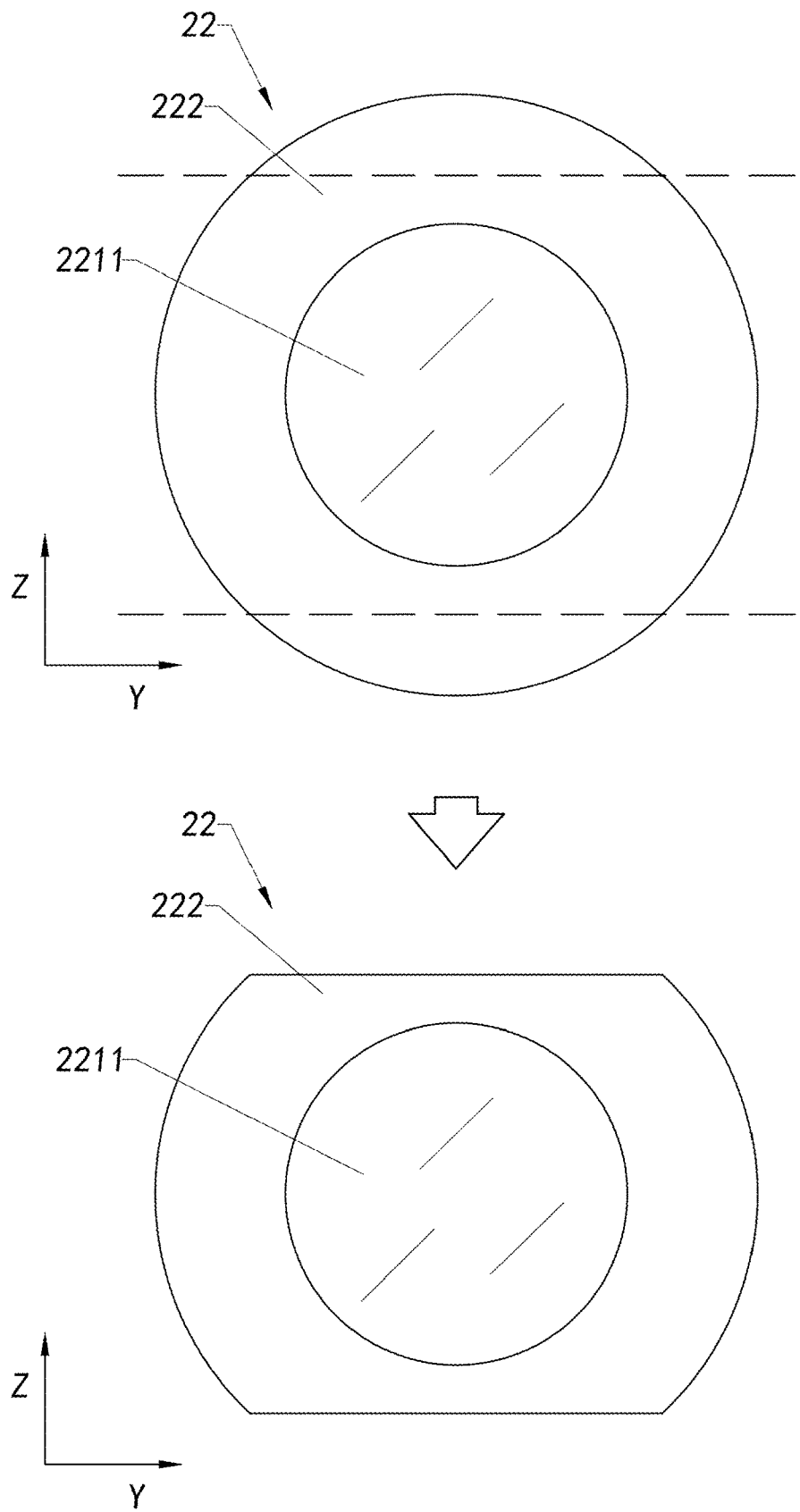
FIG. 4B is a cross-sectional view of a long-focal-length camera module according to a preferred embodiment of the present invention.
Figure 4C:
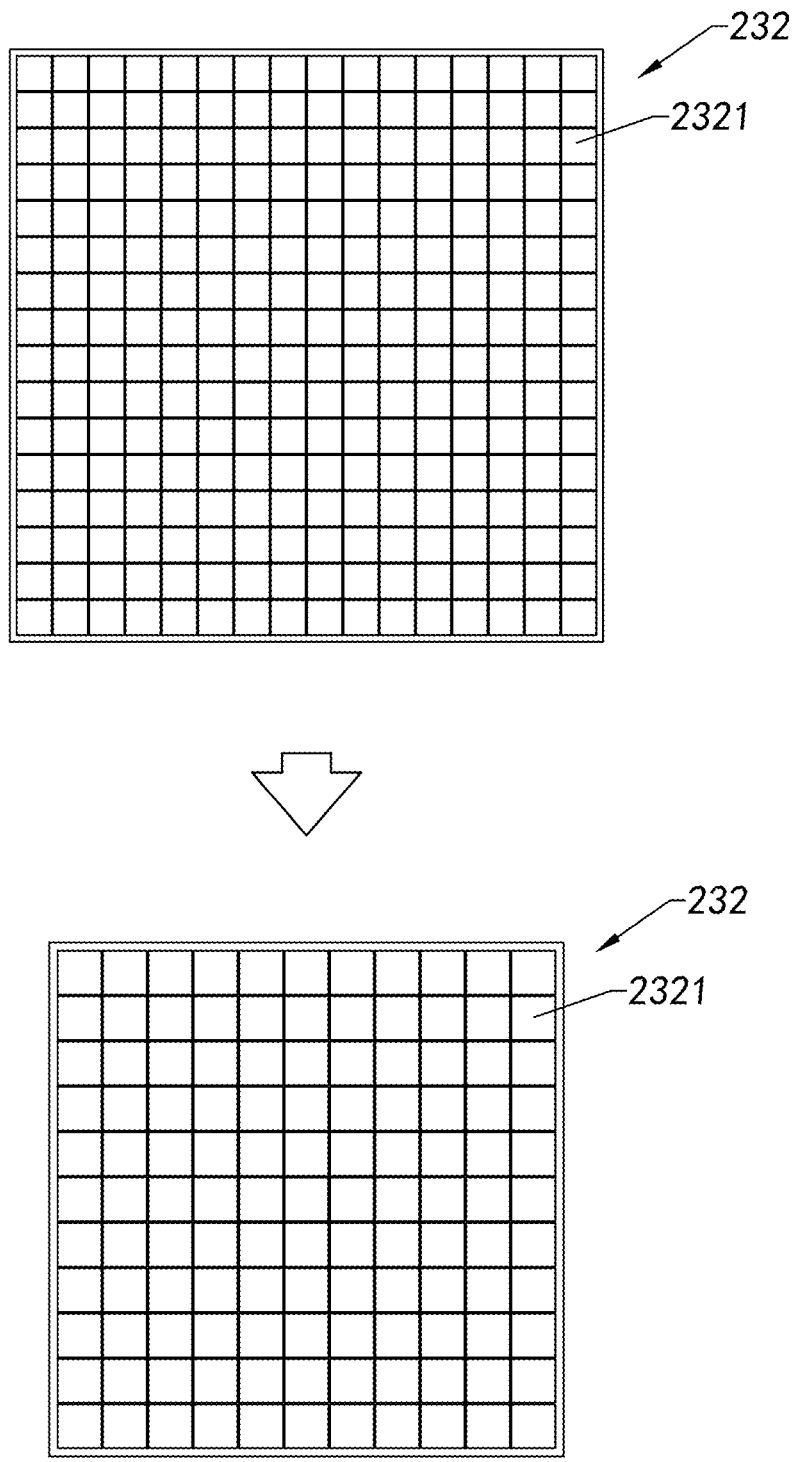
FIG. 4C is a schematic diagram of a photosensitive element according to a preferred embodiment of the present invention.

Specifically, in this example, referring to FIG. 4A and FIG. 4C, the long-focal-length photosensitive assembly 23 of the long-focal-length camera module 20 is designed to have a smaller height dimension W2 from the original height dimension. The long-focal-length photosensitive assembly 23 includes a base 231, a photosensitive element 232, and a circuit board 233, wherein the photosensitive element 232 is mounted on the circuit board 233, and the base 231 has a light window 2310, one end of the base 231 is connected to the long-focal-length lens 22 and the other end is connected to the circuit board 233. The light passes through the light window 2310 and reaches the photosensitive element 232 to be received, so that the user can observe the image information of the photographed object on the display unit 3.

The photosensitive element 232 plays an important role in limiting the dimension of the long-focal-length photosensitive assembly 23. In this embodiment, a dimension of the photosensitive element 232 can be reduced, so that the dimension, especially the height dimension of the long-focal-length photosensitive element 23, is reduced to a height, that is, the original height H2 is reduced to H2'.

Specifically, the photosensitive element 232 includes a plurality of photosensitive units 2321, and in this example, the dimension of the photosensitive element 232 is reduced by reducing the number of the photosensitive units 2321. Obviously, for the photosensitive unit 2321 of a same specification, an area occupied by a 13 million photosensitive unit 2321 is much larger than an area occupied by a 8 million photosensitive unit 2321. By reducing the number of the photosensitive unit 2321, it can extremely reduce the dimension of the photosensitive element 232. Further, as the dimension of the photosensitive element 232 is reduced, the corresponding long-focal-length lens 22 can also be designed from the original height dimension H1 to a dimension H1' which is smaller than the original dimension H1. In this way, the dimension of the long-focal-length lens 22 is simultaneously reduced. Furthermore, corresponding to the reduction in the dimension of the long-focal-length lens 22, the dimension of the light steering mechanism 21 can also be reduced, so that the dimension, especially the height dimension of the entire long-focal-length camera module 20, is reduced, so that the camera unit 1 is more suitable for a lighter and thinner electronic device 100.

It is worth noting that while the dimension of the long-focal-length lens 22 is reduced, the light entering into the long-focal-length camera module 20 may decrease, and amount of the light entering into the long-focal-length lens 22 itself is relatively small, which may cause a poor final imaging effect. In order to ensure a good imaging effect, the dimension of the single photosensitive unit 2321 can be increased while reducing the dimension of the entire photosensitive element 232 to increase the photosensitive area per pixel, thereby increasing an overall amount of light entered to make the photosensitive element 232 maintain a good photosensitive performance by increasing the dimension of the single photosensitive unit 2321 after reducing the number of the photosensitive units 2321, even in some examples of the present invention, the photoreceptive performance of the long-focal-length camera module 20 with a single larger dimension of the photosensitive unit 2321 while the smaller dimension of the photosensitive element 232 and a smaller number of the photosensitive units 2321 is even better than that of the long-focal-length camera module 20 with a single smaller dimension of the photosensitive unit 2321 while the smaller dimension of the photosensitive element 232 and a larger number of the photosensitive units 2321.

Here, the photosensitive performance is measured by a parameter (dimension of photosensitive unit $2321/F.No)^2$.

Referring to FIG. 4C, those skilled in the art can understand that the figure represents only a schematic diagram of the photosensitive unit 2321 of the photosensitive element 232, in fact, the dimension of a single photosensitive unit 2321 is very small. By reducing the number of the photosensitive units 2321 and increasing the dimension of a single photosensitive unit 2321 at the same time, while the dimension of the entire photosensitive element 232 is reduced, the photosensitive performance of the photosensitive element 232 is not reduced. In an example of the present invention, after the number of the photosensitive units 2321 of the photosensitive element 232 is changed from 13,000,000 to 8000,000, the dimension of the photosensitive unit 2321 is increased at the same time, but a measured parameter of amount of light entered—(The dimension of the photosensitive unit $2321/F.No)^2$ is increased, so as to reduce the overall dimension of the photosensitive element 232 while ensuring the working efficiency of the photosensitive element 232.

In order to further reduce the height dimension of the long-focal-length camera module 20, the dimension of the long-focal-length photosensitive assembly 23 can also be reduced after the dimension of the photosensitive element 232 has been reduced.

Figure 5A:
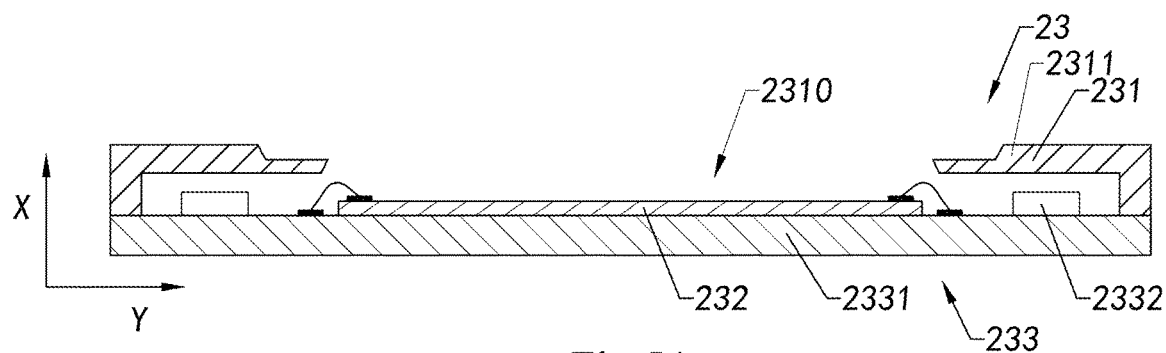
FIG. 5A is a schematic diagram of a long-focal-length photosensitive assembly according to a preferred embodiment of the present invention.

Referring to FIG. 5A, the long-focal-length photosensitive assembly 23 includes a base 231, a photosensitive element 232 and a circuit board 233, wherein the photosensitive element 232 is provided on the circuit board 233, and the base 231 is formed around the photosensitive element 232 and supported on the circuit board 233. The circuit board 233 includes a substrate 2331 and a plurality of electronic components 2332, wherein the electronic components 2332 are formed on the substrate 2331 and are mounted by SMT process, etc. Types of the electronic components 2332 include but are not limited to resistors, capacitors, driving devices, and the like.

The base 231 includes an annular base body 2311 with a light window 2310 in the middle to provide an optical path for the long-focal-length lens 22 and the photosensitive element 232. The photosensitive element 232 is operatively connected to the circuit board 233. For example, the photosensitive element 232 is connected to the circuit board 233 by COB (Chip On Board) wiring and is located on the top side of the circuit board 233. The photosensitive element 232 and the long-focal-length lens 22 are respectively assembled on both sides of the base 231 and arranged in optical alignment, so that the light passing through the long-focal-length lens 22 can reach the photosensitive element 232 through the light window 2310, thereby the long-focal-length camera module 20 can provide an optical image after photoelectric conversion.

The long-focal-length camera module 20 may further include a driver, such as a voice coil motor, a piezoelectric motor, etc., that is, the long-focal-length camera module 20 may be a moving focus camera module, and the long-focal-length lens 22 is mounted on the driver, and the base 231 can be used to support the driver. The long-focal-length camera module 20 may also include a filter element, wherein the filter element is used to filter the light passing through the lens, such as an infrared cut filter, and the filter element may be configured on the top side of the base 231, or an end of the base 231 close to the long-focal-length lens 22. Those skilled in the art can understand that the long-focal-length lens 22 can be directly mounted on the base 231 of the long-focal-length photosensitive assembly 23 without the driver, that is to say, a fixed-focus module is formed. The type of the long-focal-length camera module 20 does not limit the present invention.

On the basis that the dimension of the photosensitive element 232 is reduced, the dimension of the base 231 and the circuit board 233 restricts the reduction of the height dimension of the long-focal-length photosensitive assembly 23. However, one of the determining factors of the dimension of the base 231 is a distance between the base 231 and the photosensitive element 232. The greater the distance between the base 231 and the photosensitive element 232 is, the larger the dimension of the base 231 is required, and the dimension of the circuit board 233 for supporting the base 231 is correspondingly larger. The height of the long-focal-length photosensitive assembly 20 in the Z-axis direction can be further reduced by reducing the base 231 and the photosensitive element 232.

Figure 5B:
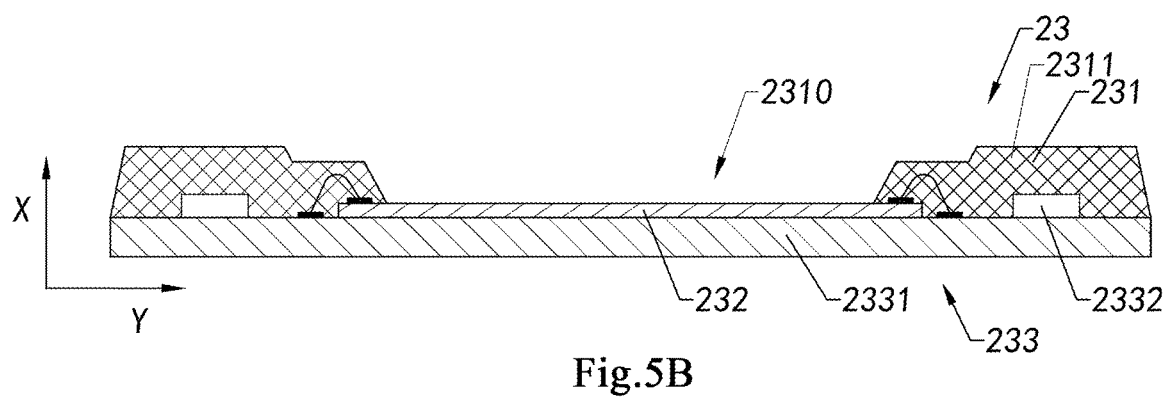
FIG. 5B is a schematic diagram of a long-focal-length photosensitive assembly according to a preferred embodiment of the present invention.

Referring to FIG. 5B, it is a modified embodiment of the long-focal-length photosensitive assembly 23 according to the above-mentioned embodiment. In this embodiment, the base 231 is integrally formed on the circuit board 233 and a non-photosensitive area around the photosensitive element 232 through a molding process. In this way, the gap between the base 231 and the photosensitive element 232 is reduced, thereby reducing the height dimension of the base 231, and also reducing the required height dimension of the circuit board 233, thereby it is more beneficial to reduce the height dimension of the entire long-focal-length photosensitive assembly 23. The base 231 includes an annular base body 2311 with a light window 2310 in the middle to provide an optical path for the long-focal-length lens 22 and the photosensitive element 232.

The base 231 is integrally formed on the photosensitive element 232 and the circuit board 233, so that the base 231 can replace the lens holder or bracket of the traditional camera module, and does not need to be attached to the circuit board 233 by glue.

Another factor affecting the height dimension of the long-focal-length photosensitive assembly 23 is the dimension of the circuit board 233 in the Z-axis direction.

The substrate 2331 needs to provide mounting space or accommodating space for a plurality of the electronic components 2332, and the positions of the electronic components 2332 may limit the dimension reduction of the substrate 2331.

The substrate 2331 has a front surface and a back surface, wherein the front surface of the substrate 2331 faces the photosensitive element 232, and the back surface of the substrate 2331 faces away from the photosensitive element 232. The electronic component 2332 is arranged on the front surface, and the electronic component 2332 is mainly arranged on a Y-axis direction of the substrate 2331, and the electronic component 2332 is not provided or is rarely provided in the Z-axis direction. The substrate 2331 extends toward the Z-axis direction and the Y-axis direction respectively, so that the substrate 2331 does not need to reserve a mounting position for the electronic component 2332 in the Z-axis direction, thereby reducing the height of the base 231 in the Z-axis direction. In some examples of the present invention, the electronic component 2332 is embedded in the substrate 2331, and the electronic component 2332 is mainly provided in a Y-axis direction of the substrate 2331, and the electronic component 2332 is not provided or is rarely provided in the Z-axis direction, and the substrate 2331 extends toward the Z-axis direction and the Y-axis direction respectively, so that the substrate 2331 does not need to reserves an mount position for the electronic component 2332 in the Z-axis direction, thereby reducing the height of the base 231 in the Z axis direction. In other examples of the present invention, the electronic component 2332 is provided on the back surface of the substrate 2331 to reduce space occupation of the substrate 2331 in the Z-axis direction by the electronic component 2332, so that the substrate 2331 has a possibility of reducing the height in the Z-axis direction.

Figure 5C:
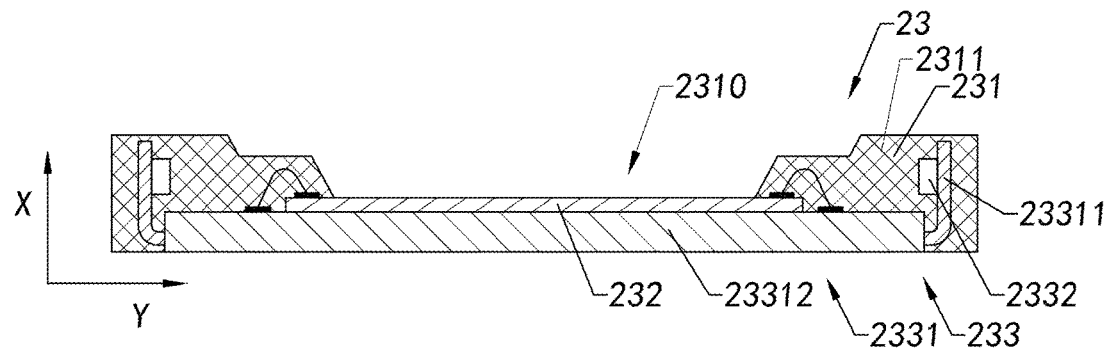
FIG. 5C is a schematic diagram of a long-focal-length photosensitive assembly according to a preferred embodiment of the present invention.

Referring to FIG. 5C, it is a modified embodiment of the long-focal-length photosensitive assembly 23 according to the present invention, wherein the long-focal-length photosensitive assembly 23 includes a base 231, a photosensitive element 232 and a circuit board 233, wherein the base 231 is integrally formed on the photosensitive element 232 and the circuit board 233 through a molding process.

The base 231 includes a annular base body 2311 and a light window 2310 to provide an optical path for the long-focal-length lens 22 and the photosensitive element 232.

Further, the circuit board 233 includes a substrate 2331 and a plurality of electronic components 2332, wherein the substrate 2331 is a flexible substrate 2331, and the substrate 2331 includes a folding portion 23311 and a non-folding portion 23312, wherein the folding portion 23311 is located on both sides of the non-folding portion 23312 and are integrally extended to the non-folding portion 23312. The folding portion 23311 is configured to extend from the end of the non-folding portion 23312 toward the base 231. In other words, the folding portion 23311 of the substrate 2331 is completely embedded on the base 231.

The electronic component 2332 may be provided on the folding portion 23311 of the substrate 2331, for example, directly provided on the surface of the folding portion 23311 or embedded in the folding portion 23311. The electronic component 2332 may also be provided on the non-folding portion 23312 of the substrate 2331, or the electronic component 2332 may be provided on the folding portion 23311 and the non-folding portion 23312 of the substrate 2331, respectively.

In this way, the height of the circuit board 233 in the Z-axis direction is reduced, because part of the circuit board 233 in the Z-axis direction is accommodated in the base 231 in a manner extending in the X-axis direction, thereby reducing the height dimension of the circuit board 233 in the Z-axis direction.

Further, continuing to refer to FIG. 4A and FIG. 4B, after the dimension of the long-focal-length photosensitive assembly 23 is reduced, the dimension of the long-focal-length lens 22 matching the long-focal-length photosensitive assembly 23 can also be designed smaller.

Specifically, the long-focal-length lens 22 includes a light-transmitting element group 221, wherein the light-transmitting element group 221 includes a plurality of light-transmitting elements, wherein the light-transmitting element is located in an optical path of the long-focal-length lens to transmit the light from the light steering mechanism. The light-transmitting element group 221 includes a plurality of light-transmitting elements, wherein one of the light-transmitting elements first receives light from the light steering mechanism 21, and the light-transmitting element is called a first light-transmitting element 2211.

Furthermore, the long-focal-length lens 22 includes a supporting element 222, wherein the light-transmitting element group 221 is supported on the supporting element 222, so that each light-transmitting element is stably maintained in the same optical path. While the dimension of the light-transmitting element group 221 is reduced, the thickness of the supporting element 222 in the Z-axis direction limits the reduction in the height dimension of the long-focal-length lens 22.

In some embodiments of the present invention, the supporting element 222 is designed as an annular cylindrical supporting element 222, and light passes through the light-transmitting element group 221 located on the supporting element 222 in the X-axis direction, and the height dimension of the supporting element 222 in the Z-axis direction is designed to be smaller than the height dimension in the Y-axis direction, or in other words, the radial dimension of the supporting element 222 in the Z-axis direction is designed to be smaller than the radial dimension in the Y-axis direction. That is, the height dimension of the supporting element 222 in the Z-axis direction is reduced. For example, as shown in FIG. 4B, by controlling the thickness of the supporting element 222 in the Z-axis direction, the height dimension of the entire long-focal-length lens 22 in the Z-axis direction is also reduced. The method of controlling the thickness of the supporting element 222 in the Z-axis direction may be to cut the supporting element 222 or to control the thickness of the supporting element 222 in the Z-axis direction during the process of manufacturing the supporting element 222.

In some examples of the present invention, the light-transmitting element group 221 is supported on the supporting element 222, and the light-transmitting element group 221 is exposed outside the supporting element 222 in the Z-axis direction. More specifically, the light-transmitting element group 221 has a first side surface, a second side surface, a third side surface and a fourth side surface. Wherein, when the long-focal-length camera module 20 is mounted on the electronic device body, the third side surface is closer to the electronic device body 1000 than the first side surface, the direction of the first side surface facing the third side surface is the Z-axis direction, and the direction of the second side surface facing the four side surfaces is the Y-axis direction, wherein the first side surface and the third side surface are provided oppositely, the second side surface and the fourth side surface are provided oppositely, wherein the first side surface and the third side surface are exposed outside the supporting element 222, that is, at this time, the height dimension of the supporting element 222 in the Z-axis direction is lower than the height dimension in the Y-axis direction. In other words, on the first side surface and the third side surface, the light-transmitting element group 221 is at least partially unwrapped by the supporting element 222, relative to the completely wrapped second side surface and the four side surface, the height dimension of the long-focal-length lens 22 in the Z-axis direction can be set lower than the height dimension in the Y-axis direction.

Further, continuing to refer to FIG. 4A, the light steering mechanism 21 has an incident plane 211, a reflective plane 212 and an exit plane 213. The light from the object to be photographed first enters the incident plane 211 and is then reflected by the reflective plane 212 to changes its propagation direction, and leaves the light steering mechanism 21 from the exit plane 213. The incident plane 211 and the exit plane 213 are perpendicular to each other. In this embodiment, a small angle is designed between the reflective plane 212 and the exit plane 213, and the angle between the reflective plane 212 and the exit plane 213 does not exceed 45°, and the smaller the angle between the reflective plane 212 and the exit plane 213 is, the more advantageous it is to reduce the dimension of the long-focal-length camera module 20. It can be understood that the smaller the angle between the reflective plane 212 and the exit plane 213 is, the shorter the length of the incident plane 211 is, and thus the dimension of the light steering mechanism 21 is smaller. It is also worth mentioning that the light steering mechanism 21 includes a light steering element 214 and a steering base 215, wherein the light steering element 214 is drivably provided on the steering base 215, and while the dimension of the light steering element 214 is reduced, the dimension of the steering base 215 can also be reduced accordingly.

It is worth mentioning that, in this embodiment, the light steering element 214 is a prism, and the prism can be made of resin material. The weight of the resin material is smaller, so that the light steering element 214 has a smaller weight, so that the steering base 215 that cooperates to drive the light steering element 214 can also be designed to a smaller dimension. In some examples of the present invention, the prism may also be made of glass material.

In other words, by designing the dimension of each component of the long-focal-length camera module 20, the long-focal-length camera module 20 can finally have a smaller height dimension on the basis of ensuring high zoom magnification. The relevant data of some embodiments of the present invention are shown in Table 1.

The height dimension of the long-focal-length camera module 20 provided by the present invention does not exceed 5.6 mm, and the zoom magnification can reach at least 5 times.

It should be noted that the zoom magnification here refers to a ratio of an equivalent focal length of the long-focal-length camera module 20 to an equivalent focal length of the wide-angle camera module 10. The equivalent focal length is related to the dimension of a photosensitive element 232 used in the camera module. The zoom magnification is calculated by the equivalent focal length, because the equivalent focal length is related to the light-transmitting element group 221, the angle of view of the long-focal-length lens 22, and the photosensitive element 232 of the long-focal-length photosensitive assembly 23, including the influence of the dimension factor, and can more represent the inventive spirit of the present invention.

Figure 6A:
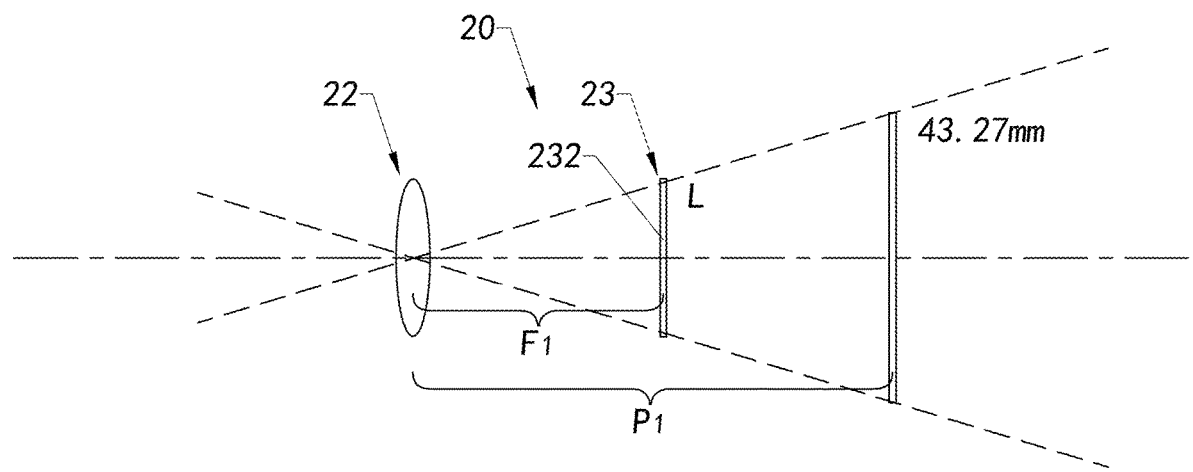
FIG. 6A is a schematic diagram of a long-focal-length camera module according to a preferred embodiment of the present invention.

Referring to FIG. 6A, taking the long-focal-length camera module 20 as an example, an effective focal length F1 refers to the focal length of the long-focal-length lens, which is a fixed parameter of the long-focal-length lens 22. After the long-focal-length lens is manufactured, L is fixed. When the effective focal length F1 of the long-focal-length lens 22 is designed to be larger, the length of the long-focal-length lens 22 will be designed to be longer accordingly.

For the equivalent focal length P1, it is considered an overall focal length of both the long-focal-length lens 22 and the long-focal-length photosensitive assembly 23, that is, the focal length of the entire camera module, when the photosensitive elements 232 of the long-focal-length photosensitive assembly 23 matched with the same long-focal-length lens 22 are different, the equivalent focal length P1 is different. In the present invention, for the zoom magnification of the long-focal-length camera module 20 and the wide-angle camera module 10, it needs to be considered the ratio of the focal lengths between the two camera modules, that is, the long-focal-length camera module 20 and the wide-angle camera module 10, instead of the ratio of the focal lengths between a long-focal-length lens 22 of the long-focal-length camera module 20 and a wide-angle lens of the wide-angle camera module 10, and the equivalent focal length are calculated as follows: taking the long-focal-length camera module as an example:

P1=F1*43.27/L, wherein F1 refers to the effective focal length of the long-focal-length lens 22, 43.27 mm refers to the diagonal length of the 135 film, and L refers to a diagonal length of a photosensitive area of the photosensitive element 232. In some examples, L refers to a diagonal length of a photosensitive area of the cmos photosensitive chip.

The equivalent focal length P1 not only takes into account the long-focal-length lens 22, the long-focal-length photosensitive assembly 23, but also the dimension factor of the photosensitive element 232.

Figure 6B:
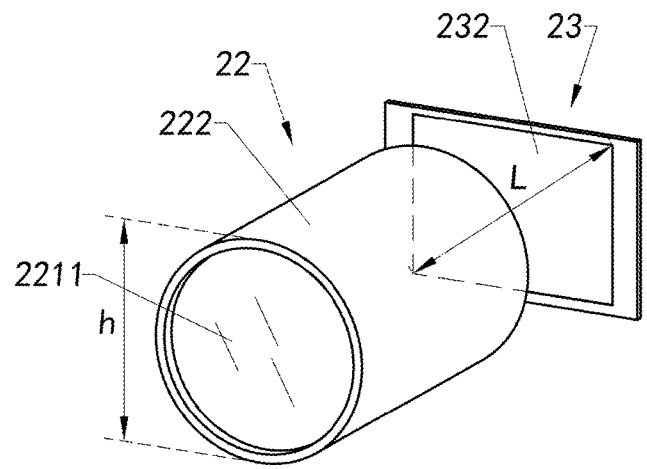
FIG. 6B is a schematic diagram of a long-focal-length camera module according to a preferred embodiment of the present invention.

Referring to FIG. 6B, a diagonal length of a photosensitive area of the photosensitive element 232 of the long-focal-length photosensitive assembly 23 is L, and a first surface of the long-focal-length lens 22 has a first height h, wherein the first surface is formed on the supporting element 222 and the first light-transmitting element 2211. L can represent the overall dimension of the photosensitive element 232, and h reflects the height of the long-focal-length lens 22 to a certain extent. When the dimension of the entire long-focal-length camera module 20, especially the height dimension, is reduced, the height of the long-focal-length lens 22 is also reduced accordingly, so that h is also becoming smaller, and the ratio of h to L greater than a certain value represents the dimension of the photosensitive element 232 is also reduced compared to the existing design. For example, the diagonal length of the existing photosensitive element is L1, and the first height of the existing long-focal-length lens is h1, then when h/L≥h1/L1 provided in this embodiment, under the premise of h<h1, L<L1, it indicates that while the height of the long-focal-length lens 22 is reduced in this embodiment, the dimension of the photosensitive element 232 is also reduced accordingly.

The h and the L satisfy the following conditions:

$h/L \geq 0.8$.

According to some embodiments of the present invention, the h and the L satisfy the following conditions:

$h/L \geq 0.89$.

According to some embodiments of the present invention, the h and the L respectively satisfy the following conditions:

5.1 mm≥h≥4.7 mm,L≤5.5 mm.

According to some embodiments of the present invention, when the h is equal to 4.9 mm, the L may be 5.0 mm, 5.1 mm, 5.2 mm and 5.3 mm.

The dimension of the photosensitive element 232 is reduced while affecting the photosensitive performance of the long-focal-length camera module 20. However, it is worth mentioning that, in this embodiment, the dimension of the photosensitive element 232 is reduced while the photosensitive performance of the long-focal-length camera module 20 is maintained or even can be increased.

Specifically, the photosensitive performance of the long-focal-length camera module 20 can be measured by the parameter $(A/F.No)^2$, A is the dimension of the photosensitive unit, F.No is the aperture value, F.No=F1/D, wherein F1 is the effective focal length, D is the aperture diameter, the unit of A is μm, and the unit of D is mm. Substitute F.No=F1/D into $(A/F.No)^2$, then the photosensitive performance of the long-focal-length camera module 20 can be measured by $(A*D/F1)^2$. Under the condition that the optical design remains unchanged, the effective focal length F1 will not change. To ensure that the photosensitive performance of the long-focal-length camera module 20 remains unchanged or be enhanced, it is necessary to maintain $A*D \geq 4.4*10^{-9}$ $m^2$, for example, according to an embodiment of the present invention, when the photosensitive unit is 1.2 μm in dimension and the aperture diameter is 3.8 mm, then a value of a product of A and D=1.2*3.8, and the result is greater than 4.4.

In the case that the first light-transmitting element 2211 of the long-focal-length camera module 20 is reduced, D remains unchanged or reduced, so it is necessary to increase A to maintain the photosensitive performance of the long-focal-length camera module 20 or to enhance the photosensitive performance of the long-focal-length camera module 20.

According to some embodiments of the present invention, the long-focal-length camera module 20 may have dimensions and/or parameters as shown in Table 1. The data in Table 1 is based on the case where the effective focal length of the long-focal-length camera module 20 is 14 mm as an example, and the measurement parameter $(A/F.No)^2$ of the amount of light entered is maintained at 0.148.

According to the table, the parameter types are the dimension of the photosensitive element 232 (the diagonal length of the photosensitive element 232 in the unit of mm), the number of the photosensitive units 2321 of the photosensitive element 232 (*1000,000), the dimension A of the photosensitive unit 2321 (μm), the diameter of the light inlet of the first light-transmitting element (mm), and the aperture value F.No, it can be understood that, in the present invention, the diameter of the light inlet of the first light-transmitting element is equal to the diameter D of the aperture, sequentially.

TABLE 1

| The diagonal length of the photosensitive element | The number of the photosensitive units | The dimension of the photosensitive unit | The diameter of the light inlet of the first light-transmitting element | F. No |
| --- | --- | --- | --- | --- |
| 5.500 | 13.000 | 1.057 | 5.096 | 2.747 |
| 5.500 | 12.000 | 1.100 | 4.896 | 2.859 |
| 5.500 | 11.000 | 1.149 | 4.688 | 2.986 |
| 5.500 | 10.000 | 1.205 | 4.470 | 3.132 |
| 5.500 | 9.000 | 1.270 | 4.240 | 3.302 |
| 5.500 | 8.000 | 1.347 | 3.998 | 3.502 |
| 5.490 | 12.500 | 1.076 | 5.006 | 2.796 |
| 5.480 | 12.000 | 1.096 | 4.914 | 2.849 |
| 5.470 | 11.500 | 1.118 | 4.819 | 2.905 |
| 5.460 | 11.000 | 1.141 | 4.722 | 2.965 |
| 5.450 | 10.500 | 1.165 | 4.622 | 3.029 |
| 5.440 | 10.000 | 1.192 | 4.519 | 3.098 |
| 5.430 | 9.500 | 1.221 | 4.413 | 3.173 |
| 5.420 | 9.000 | 1.252 | 4.303 | 3.254 |
| 5.410 | 8.500 | 1.286 | 4.189 | 3.342 |
| 5.400 | 8.000 | 1.323 | 4.072 | 3.438 |

According to some embodiments of the present invention, the ratio between the equivalent focal length of the long-focal-length camera module 20 and the equivalent focal length of the wide-angle camera module 10 is not less than 4, and the height dimension of the long-focal-length camera module 20 does not exceed 5.6 mm. Further, according to some embodiments of the present invention, the height dimension of the camera unit 1 does not exceed 5.6 mm.

According to some embodiments of the present invention, the dimension A of a single photosensitive unit 2321 is ≥1.2 μm, and an aperture diameter D of the long-focal-length lens 22 satisfies the following conditions:

3.76 mm≤D≤5.3 mm

According to some embodiments of the present invention, wherein an aperture diameter D of the long-focal-length lens 22 satisfies the following conditions:

3.8 mm≤D≤5.3 mm.

According to some embodiments of the present invention, wherein the value of the product of A and D is ≥4.4, wherein the unit of A is μm and the unit of D is mm.

According to some embodiments of the present invention, the ratio between the equivalent focal length of the long-focal-length camera module 20 and the equivalent focal length of the wide-angle camera module 10 is not less than 5.

According to some embodiments of the present invention, a range of the equivalent focal length of the long-focal-length camera module 20 is 80 mm to 160 mm, and a range of the equivalent focal length of the wide-angle camera module 10 is 20 mm to 40 mm.

According to some embodiments of the present invention, the dimension of a single photosensitive unit 2321 is not less than 1.2 μm.

According to some embodiments of the present invention, the aperture value F.No satisfies the following conditions:

4≥F.No≥3.25

According to some embodiments of the present invention, the dimension of the photosensitive unit is not less than 1.2 μm. Alternatively, the dimension of the photosensitive unit is 1.2 μm to 1.5 μm.

Figure 7:
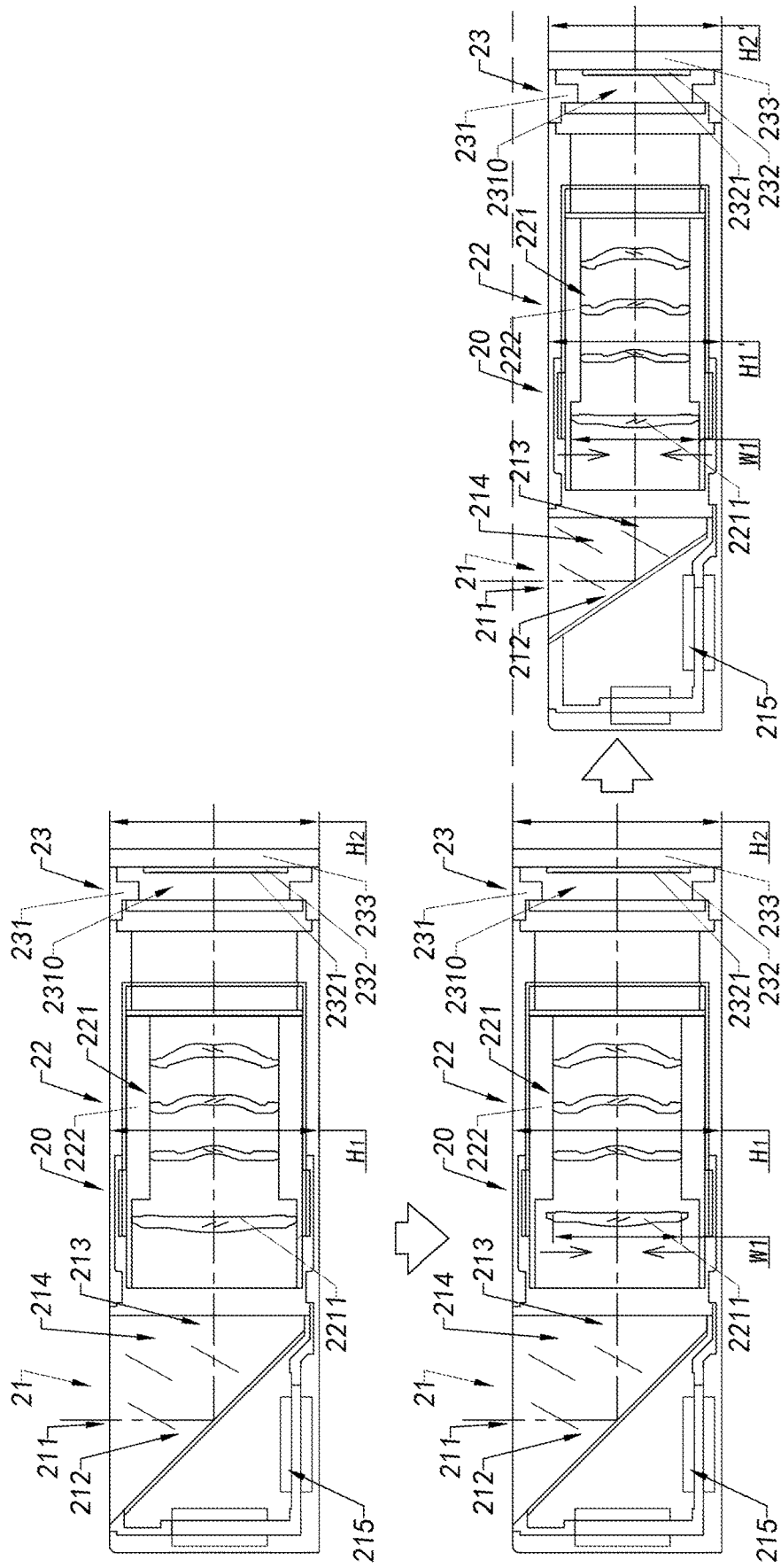
FIG. 7 is a schematic diagram of a long-focal-length camera module according to a preferred embodiment of the present invention.

For example, the photosensitive unit 2321 of the photosensitive element 232 used in the long-focal-length photosensitive assembly 23 of the long-focal-length camera module 20 is 8M, and the dimension of the photosensitive unit 2321 is 1.25 μm. In the camera unit 1, the wide-angle camera module 10 can use a wide-angle lens with an effective focal length of 3.55 mm, and the long-focal-length camera module 20 can use a long-focal-length lens 22 with an effective focal length of 14.43 mm. Accordingly, the equivalent focal length of the wide-angle lens is equal to 24.4 mm, and the equivalent focal length of the long-focal-length lens 22 is equal to 122 mm. The zoom magnification of the camera unit 1 is equal to 5. Referring to FIG. 7 and referring to FIG. 2, a long-focal-length camera module 20 according to another embodiment of the present invention is illustrated.

The long-focal-length camera module 20 includes a light steering mechanism 21, a long-focal-length lens 22, and a long-focal-length photosensitive assembly 23, wherein light passes through the light steering mechanism 21, the long-focal-length lens 22 and the long-focal-length photosensitive assembly 23 in this order, the light steering mechanism 21 turns the light from the object to be photographed and then make it pass through a long-focal-length lens 22 to be received by a long-focal-length photosensitive assembly 23 for imaging.

In this embodiment, a light-transmitting element of the light-transmitting element group 221 of the long-focal-length lens 22 is designed to have a smaller diameter as much as possible to reduce a height dimension of the long-focal-length lens 22, and at the same time the light-transmitting element can maintain enough light to pass through to obtain a desired imaging effect, and can make the entire long-focal-length lens 22 work normally in the long-focal-length camera module 20 so that the long-focal-length photosensitive assembly 23 of the long-focal-length camera module 20 receives enough light to provide an image.

it can be understood by those skilled in the art that the number of the light-transmitting elements may be 4, 5, 6, or 7, and the number of the light-transmitting elements does not limit the present invention.

The light-transmitting element group 221 includes a plurality of light-transmitting elements, wherein one of the light-transmitting elements first receives light from the light steering mechanism 21, and the light-transmitting element is called a first light-transmitting element 2211. The dimension of the first light-transmitting element 2211 is limited by the entrance pupil diameter, and for the light-transmitting elements in the light-transmitting element group 221 except for the first light-transmitting element 2211, because the long-focal-length camera module 20 has a smaller angle of view, in order to match the smaller angle of view, the light-transmitting elements other than the first light-transmitting element 2211 can be designed as a smaller dimension. In other words, the dimension of the first light-transmitting element 2211 in the light-transmitting element group 221 limits the reduction in the dimension of the entire light-transmitting element group 221, thereby limiting the reduction in the dimension of the entire long-focal-length lens 22.

In order to reduce the first light-transmitting element 2211, the long-focal-length lens 22 with a smaller aperture is designed in this embodiment. The smaller the aperture is, the larger the aperture value F.No is, wherein the aperture value F.No=effective focal length/diameter of the light inlet. Correspondingly, with the effective focal length unchanged, the diameter of the light inlet becomes smaller as the aperture becomes smaller, so that the first light-transmitting element 2211 can be designed to have a smaller dimension W2 from an original height W1. After the first light-transmitting element 2211 is designed to have a smaller dimension W2, the dimension of the light-transmitting element group 221 can also be designed to be a smaller dimension, so that the dimension H1 of the entire long-focal-length lens 22 is designed to be a smaller dimension H1', thus contributes to the height reduction of the long-focal-length lens 22.

Furthermore, the long-focal-length lens 22 includes a supporting element 222, wherein the light-transmitting element group 221 is supported on the supporting element 222, so that each light-transmitting element is stably maintained in the same optical path. While the dimension of the light-transmitting element group 221 is reduced, the thickness of the supporting element 222 in the Z-axis direction limits the reduction in the height dimension of the long-focal-length lens 22.

In some examples of the present invention, the supporting element 222 is designed as an annular cylindrical supporting element 222, and light passes through the light-transmitting element group 221 located on the supporting element 222 in the X-axis direction. The height dimension of the supporting element 222 in the Z-axis direction is designed to be smaller than the height dimension in the Y-axis direction, that is, the height dimension of the supporting element 222 in the Z-axis direction is reduced.

In some examples of the present invention, the light-transmitting element group 221 is supported by the supporting element 222, and the light-transmitting element group 221 is exposed outside the supporting element 222 in the Z-axis direction. More specifically, the light-transmitting element group 221 has a first side surface, a second side surface, a third side surface, and a fourth side surface. Wherein, when the long-focal-length camera module 20 is mounted on the electronic device body 1000, the third side surface is closer to the electronic device body 1000 than the first side surface, the direction of the first side surface facing the third side surface is the Z-axis direction, and the direction the second side surface facing the fourth side surface is the Y-axis direction, wherein the first side surface and the third side surface are provided oppositely, the second side surface and the fourth side surface are provided oppositely, wherein the first side surface and the third side surface are exposed outside the supporting element 222, that is, at this time, the height dimension of the supporting element 222 in the Z-axis direction is lower than the height dimension in the Y-axis direction.

Correspondingly, the problem caused by the small aperture is the lack of the amount of light entered. In addition, the amount of light entered of the long-focal-length lens 22 itself is limited. The dimension of a single photosensitive unit 2321 of a photosensitive element 232 of the long-focal-length photosensitive assembly 23 can be increased so that the single photosensitive unit 2321 captures more photons, thereby ensuring the photosensitive performance of the entire photosensitive element 232, so that the problem of insufficient amount of light entered caused by the small aperture can be compensated or even improved, so as to keep the long-focal-length camera module 20 still having a better imaging effect.

It is worth mentioning that a single photosensitive unit 2321 of the photosensitive element 232 is designed with a larger photosensitive area, and the dimension of the photosensitive element 232 may not be increased.

Specifically, the photosensitive element 232 includes a plurality of photosensitive units 2321. By increasing the dimension of the single photosensitive unit 2321 and reducing the number of the photosensitive units 2321, the photosensitive amount of the photosensitive element 232 is not weakened while keeping the dimension of the photosensitive element 232 is not increased, or even shrinking the dimension of the photosensitive element 232, so that the long-focal-length photosensitive assembly 23 does not limit the reduction of the height dimension of the long-focal-length camera module 20.

In order to further reduce the height dimension of the long-focal-length camera module 20, it is also possible to reduce the dimension of the long-focal-length photosensitive element 23 after the dimension of the photosensitive element 232 has been reduced, for example, the dimension H2 is reduced from the original dimension to a smaller dimension H2'.

Figure 8A:
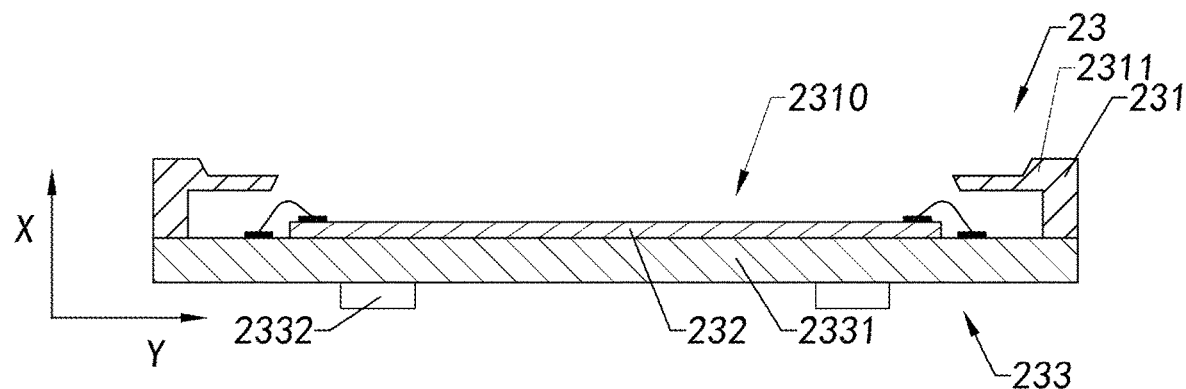
FIG. 8A is a schematic diagram of a long-focal-length photosensitive assembly according to a preferred embodiment of the present invention.

Referring to FIG. 8A, the long-focal-length photosensitive assembly 23 includes a base 231, a photosensitive element 232 and a circuit board 233, wherein the photosensitive element 232 is provided on the circuit board 233, and the base 231 is formed surround the photosensitive element 232 and supported by the circuit board 233. The circuit board 233 includes a substrate 2331 and a plurality of electronic components 2332, wherein the electronic components 2332 are formed on the substrate 2331 and are mounted by SMT process, etc. The types of the electronic components 2332 include but are not limited to resistors, capacitors, driving devices, and the like.

The base 231 includes an annular base body 2311 with a light window 2310 in the middle to provide an optical path for the long-focal-length lens 22 and the photosensitive element 232. The long-focal-length camera module 20 may further include a driver, such as a voice coil motor, a piezoelectric motor, etc., that is, the long-focal-length camera module 20 may be a moving focus camera module, and the long-focal-length lens 22 is mounted on the driver, and the base 231 can be used to support the driver. The long-focal-length camera module 20 may also include a filter element, wherein the filter element is used to filter the light passing through the lens, such as an infrared cut filter, and the filter element may be configured on the top side of the base 231, or an end of the base 231 close to the long-focal-length lens 22. Those skilled in the art can understand that the long-focal-length lens 22 can be directly mounted on the base 231 of the long-focal-length photosensitive assembly 23 without the driver, that is to say, a fixed-focus module is formed. The type of the long-focal-length camera module 20 does not limit the present invention.

On the basis that the dimension of the photosensitive element 232 is reduced, the dimension of the base 231 and the circuit board 233 restricts the reduction of the height dimension of the long-focal-length photosensitive element 23. However, one of the determining factors of the dimension of the base 231 is the distance between the base 231 and the photosensitive element 232. The greater the distance between the base 231 and the photosensitive element 232 is, the larger the size of the base 231 is required, the dimension of the circuit board 233 for supporting the base 231 becomes larger accordingly. The height of the long-focal-length photosensitive assembly 20 in the Z-axis direction can be further reduced by reducing the base 231 and the photosensitive element 232.

Figure 8B:
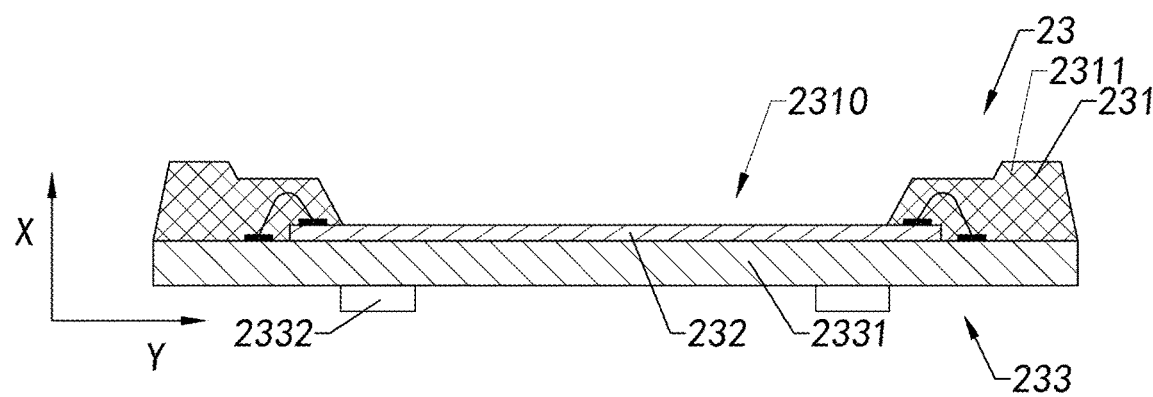
FIG. 8B is a schematic diagram of a long-focal-length photosensitive assembly according to a preferred embodiment of the present invention.

Referring to FIG. 8B, it is a modified embodiment of the long-focal-length photosensitive assembly 23 according to the above embodiment, In this embodiment, the base 231 is integrally formed on a non-photosensitive area around the circuit board 233 and the photosensitive element 232 through a molding process. In this way, the gap between the base 231 and the photosensitive element 232 is reduced, thereby reducing the height dimension of the base 231, and also reducing the required height dimension of the circuit board 233, thereby it is more beneficial to reduce the height dimension of the entire long-focal-length photosensitive assembly 23. The base 231 includes an annular base body 2311 with a light window 2310 in the middle to provide an optical path for the long-focal-length lens 22 and the photosensitive element 232.

The base 231 is integrally formed on the photosensitive element 232 and the circuit board 233, so that the base 231 can replace the lens holder or bracket of the traditional camera module, and does not need to be attached to the circuit board 233 by glue.

Another factor affecting the height dimension of the long-focal-length photosensitive assembly 23 is the dimension of the circuit board 233 in the Z-axis direction.

The substrate 2331 needs to provide mounting space or accommodating space for a plurality of the electronic components 2332, and the position of the electronic component 2332 may limit the reduction of the dimension of the substrate 2331.

The substrate 2331 has a front surface and a back surface, wherein the front surface of the substrate 2331 faces the photosensitive element 232, and the back surface of the substrate 2331 faces away from the photosensitive element 232. In some embodiments of the present invention, the electronic component 2332 is provided on the front surface, and the electronic component 2332 is mainly provided in a Y-axis direction of the substrate 2331, and the electronic component 2332 is not provided in the Z-axis direction or is rarely provided, and the substrate 2331 extends toward the Z-axis direction and the Y-axis direction, respectively, so that the substrate 2331 does not need to reserve a mounting position for the electronic component 2332 in the Z-axis direction, thereby reducing the height of the base 231 in the Z-axis direction. In some examples of the present invention, the electronic component 2332 is embedded in the substrate 2331, and the electronic component 2332 is mainly provied in a Y-axis direction of the substrate 2331, and the electronic component 2332 is not provied in the Z-axis direction or is rarely provided, and the substrate 2331 extends toward the Z-axis direction and the Y-axis direction respectively, so that the substrate 2331 does not need to reserve a mounting position for the electronic component 2332 in the Z-axis direction, thereby reducing the height of the base 231 in the Z axis direction. In this example, the electronic component 2332 is provied on the back surface of the substrate 2331 to reduce the space occupation of the substrate 2331 by the electronic component 2332 in the Z-axis direction, so that the substrate 2331 has the possibility of reducing the height in the Z-axis direction.

Figure 8C:
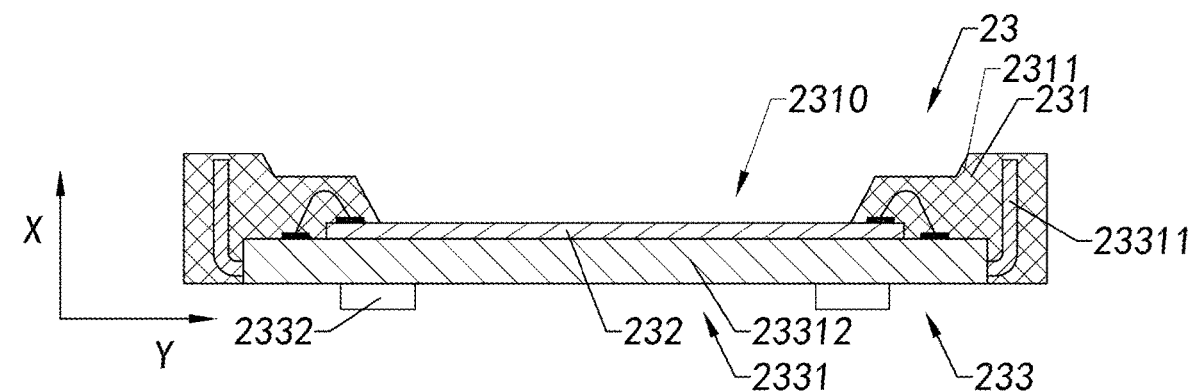
FIG. 8C is a schematic diagram of a long-focal-length photosensitive assembly according to a preferred embodiment of the present invention.

Referring to FIG. 8C, it is a modified embodiment of the long-focal-length photosensitive assembly 23 according to the present invention, wherein the long-focal-length photosensitive assembly 23 includes a base 231, a photosensitive element 232, and a circuit board 233, wherein the base 231 is integrally formed on the photosensitive element 232 and the circuit board 233 through a molding process.

The base 231 includes a annular module base body 2311 and a light window 2310 to provide an optical path for the long-focal-length lens 22 and the photosensitive element 232.

Further, the circuit board 233 includes a substrate 2331 and a plurality of electronic components 2332, wherein the substrate 2331 is a flexible substrate 2331, and the substrate 2331 includes a folding portion 23311 and a non-folding portion 23312, wherein the folding portions 23311 is located on both sides of the non-folding portion 23312 and is integrally extended to the non-folding portion 23312. The folding portion 23311 is configured to extend from the end of the non-folding portion 23312 toward the base 231. In other words, the folding portion 23311 of the substrate 2331 is completely embedded on the base 231.

The electronic component 2332 may be provided on the folding portion 23311 of the substrate 2331, for example, directly provided on the surface of the folding portion 23311 or embedded in the folding portion 23311. The electronic component 2332 may also be provided on the non-folding portion 23312 of the substrate 2331, or the electronic component 2332 may be provided on the folding portion 23311 and the non-folding portion 23312 of the substrate 2331, respectively.

In this way, the height of the circuit board 233 in the Z-axis direction is reduced, because the circuit board 233 is accommodated in the base 231 in the Z-axis direction in a manner of extending in the X-axis direction, thereby reducing the height dimension of the circuit board 233 in the Z-axis direction.

Further, continuing to refer to FIG. 7, the light steering mechanism 21 has an incident plane 211, a reflective plane 212 and an exit plane 213. The light from the object to be photographed first enters the incident plane 211 and is then reflected by the reflective plane 212 to change its propagation direction, and leaves the light steering mechanism 21 from the exit plane 213. The incident plane 211 and the exit plane 213 are perpendicular to each other. In this embodiment, a small angle is designed between the reflective plane 212 and the exit plane 213, and it does not exceed 45°, and the smaller the angle between the reflective plane 212 and the exit plane 213 is, the more advantageous it is to reduce the dimension of the long-focal-length camera module 20. It can be understood that the smaller the angle between the reflective plane 212 and the exit plane 213 is, the shorter the length of the incident plane 211 is, and thus the dimension of the light steering mechanism 21 is smaller. It is also worth mentioning that the light steering mechanism 21 includes a light steering element 214 and a steering base 215, wherein the light steering element 214 is drivably provided on the steering base 215, and while the dimension of the light steering element 214 is reduced, the dimension of the steering base 215 can also be reduced accordingly.

It is worth mentioning that, in this embodiment, the light steering element 214 is a prism, and the prism can be made of resin material. The weight of the resin material is smaller, so that the light steering element 214 has a smaller weight, so that the steering base 215 that cooperates to drive the light steering element 214 can also be designed in a smaller dimension. The long-focal-length camera module 20 designed and manufactured in the above manner can have a smaller height dimension while having a good zoom performance, which is beneficial to be suitable for the lighter and thinner electronic device 100. In some embodiments of the present invention, the height dimension of the long-focal-length camera module 20 does not exceed 5.6 mm, and the zoom magnification can reach at least 5 times. In some embodiments of the present invention, the prism may also be made of glass material.

It should be noted that the zoom magnification here refers to the ratio of an equivalent focal length of the long-focal-length camera module 20 to an equivalent focal length of the wide-angle camera module 10. The equivalent focal length is related to the dimension of a photosensitive element 232 used in the camera module.

According to some embodiments of the present invention, the long-focal-length camera module 20 may have the dimension and/or parameters as shown in Table 2. Some examples in which the height dimension of the long-focal-length camera module 20 does not exceed 5.6 mm and the zoom magnification is not less than 4 times are shown in the table.

According to the table, the parameter types are F.No, the diameter of the light inlet of the first light-transmitting element (mm), the dimension of the photosensitive unit 2321 ($\mu$m), (the dimension of the photosensitive unit/F.No)$^2$, The number of photosensitive units 2321 of the photosensitive element 232 (*1000,000), the dimension of the photosensitive element 232 (the diagonal length of the photosensitive element in a unit of mm) sequentially.

TABLE 2

| F. No | The diameter of light inlet of first light-transmitting element | The dimension of the photo-sensitive unit | (The dimension of the photo-sensitive unit/F. No)$^2$ | The number of photo-sensitive units | The diagonal length of the photo-sensitive element |
|---|---|---|---|---|---|
| 2.601 | 5.383 | 1.000 | 0.148 | 14.520 | 5.500 |
| 2.731 | 5.126 | 1.050 | 0.148 | 13.122 | 5.490 |
| 2.861 | 4.893 | 1.100 | 0.148 | 11.913 | 5.480 |
| 2.861 | 4.893 | 1.110 | 0.151 | 11.699 | 5.480 |
| 2.861 | 4.893 | 1.120 | 0.153 | 11.491 | 5.480 |
| 2.861 | 4.893 | 1.130 | 0.156 | 11.289 | 5.480 |
| 2.861 | 4.893 | 1.140 | 0.159 | 11.092 | 5.480 |
| 2.861 | 4.893 | 1.150 | 0.162 | 10.900 | 5.480 |
| 2.861 | 4.893 | 1.160 | 0.164 | 10.712 | 5.480 |
| 2.861 | 4.893 | 1.170 | 0.167 | 10.530 | 5.480 |
| 2.861 | 4.893 | 1.180 | 0.170 | 10.352 | 5.480 |
| 2.861 | 4.893 | 1.190 | 0.173 | 10.179 | 5.480 |
| 2.861 | 4.893 | 1.200 | 0.176 | 10.010 | 5.480 |
| 2.991 | 4.681 | 1.150 | 0.148 | 10.860 | 5.470 |
| 3.121 | 4.486 | 1.200 | 0.148 | 9.937 | 5.460 |
| 3.251 | 4.306 | 1.250 | 0.148 | 9.125 | 5.450 |
| 3.381 | 4.141 | 1.300 | 0.148 | 8.405 | 5.440 |
| 3.511 | 3.987 | 1.350 | 0.148 | 7.766 | 5.430 |
| 3.641 | 3.845 | 1.400 | 0.148 | 7.194 | 5.420 |
| 3.771 | 3.712 | 1.450 | 0.148 | 6.682 | 5.410 |
| 3.901 | 3.589 | 1.500 | 0.148 | 6.221 | 5.400 |
| 4.031 | 3.473 | 1.550 | 0.148 | 5.826 | 5.400 |

According to another aspect of the present invention, a method for manufacturing a camera unit is provided, which includes the following steps:

providing a long-focal-length camera module with a height not exceeding 5.6 mm and a wide-angle camera module, wherein a ratio of equivalent focal lengths of the long-focal-length camera module and the wide-angle camera module is not less than 4; and assembling the long-focal-length camera module and the wide-angle camera module to form a camera unit.

According to an embodiment of the present invention, in the above method, the long-focal-length camera module includes a light steering mechanism, a long-focal-length lens, and a long-focal-length photosensitive assembly, wherein the light steering mechanism is used for steering the light to pass through the long-focal-length lens to be received by the long-focal-length photosensitive assembly for imaging, wherein a first surface of the long-focal-length lens has a first height h, and a diagonal length of a photosensitive area of a photosensitive element of the long-focal-length photosensitive assembly is L, wherein the h and L meet the following conditions:

$h/L \geq 0.8$.

According to an embodiment of the present invention, in the above method, the long-focal-length camera module includes a light steering mechanism, a long-focal-length lens, and a long-focal-length photosensitive assembly, wherein the light steering mechanism is used for steering the light to pass through the long-focal-length lens to be received by the long-focal-length photosensitive assembly for imaging, wherein a height dimension of the long-focal-length camera module does not exceed 5.6 mm, wherein a dimension of a photosensitive unit of a photosensitive element of the long-focal-length photosensitive assembly is A, and a diameter of an aperture of the long-focal-length lens is D, wherein A and D meet the following conditions:

a value of a product of A and D is ≥4.4, wherein the unit of A is μm and the unit of D is mm. Those skilled in the art should understand that the above description and the embodiments of the present invention shown in the accompanying drawings are only for illustration and do not limit the present invention. The purpose of the present invention has been completely and effectively achieved. The functions and structural principles of the present invention have been shown and explained in the embodiments. Without departing from the principles, the implementation of the present invention may have any modification or changes.

The invention claimed is:

1. A camera unit with a light steering mechanism, the camera unit comprising:
   a long-focal-length camera module; and
   a wide-angle camera module, wherein
   the wide-angle camera module provides a wide-angle image, and a ratio between an equivalent focal length of the long-focal-length camera module and an equivalent focal length of the wide-angle camera module is not less than 4,
   the long-focal-length camera module includes a light steering mechanism, a long-focal-length lens and a long-focal-length photosensitive assembly,
   the light steering mechanism is configured to turn light to pass through the long-focal-length lens to be received by the long-focal-length photosensitive assembly,
   a height dimension of the long-focal-length camera module does not exceed 5.6 mm,
   a first surface of the long-focal-length lens has a first height h, and a diagonal length of a photosensitive area of a photosensitive element of the long-focal-length photosensitive assembly is L, where h and L satisfy the following condition:

$h/L \geq 0.8$,

L is reduced by reducing a number of photosensitive units in the photosensitive area of the photosensitive element and increasing a size of the photosensitive units,
   a dimension A of one of the photosensitive units is $A \geq 1.2$ μm, and
   a diameter D of an aperture of the long-focal-length lens satisfies the following condition:

$5.3 \text{ mm} \geq D \geq 3.76 \text{ mm}$.

2. The camera unit according to claim 1, wherein the ratio between the equivalent focal length of the long-focal-length camera module and the equivalent focal length of the wide-angle camera module is not less than 5.

3. The camera unit according to claim 2, wherein h and L respectively satisfy the following conditions:

$5.1 \text{ mm} \geq h \geq 4.7 \text{ mm}, L \leq 5.5 \text{ mm}$.

4. The camera unit according to claim 1, wherein a range of the equivalent focal length of the long-focal-length camera module is 80 mm~160 mm, and a range of the equivalent focal length of the wide-angle camera module is 20 mm~40 mm.

5. The camera unit according to claim 1, wherein a height dimension of the camera unit does not exceed 5.6 mm.

6. The camera unit according to claim 1, wherein
   the long-focal-length photosensitive assembly further includes a base and a circuit board, and
   the base is integrally formed on the photosensitive element and the circuit board.

7. The camera unit according to claim 6, wherein
   the circuit board includes a substrate and a plurality of electronic components, and
   the electronic components are provided on a Y-axis direction of the substrate.

8. The camera unit according to claim 1, wherein
   the light steering mechanism has an incident plane, a reflective plane, and an exit plane,
   the incident plane allows light to enter, and light reflected by the reflective plane enters the long-focal-length lens through the exit plane, and
   an angle between the reflective plane and the exit plane does not exceed 45°.

9. The camera unit according to claim 1, wherein
   the light steering mechanism includes a prism, and
   the prism is made of resin material.

10. The camera unit according to claim 1, wherein
    the long-focal-length lens includes a light-transmitting element group and a supporting element,
    the light-transmitting element group is accommodated in the supporting element, and
    a radial dimension of the supporting element in a Z-axis direction is lower than a radial dimension of the supporting element in a Y-axis direction.

11. A camera unit with a light steering mechanism, the camera unit comprising:
    a long-focal-length camera module; and
    a wide-angle camera module, wherein
    the wide-angle camera module provides a wide-angle image, and a ratio between an equivalent focal length of the long-focal-length camera module and an equivalent focal length of the wide-angle camera module is not less than 4,
    the long-focal-length camera module includes a light steering mechanism, a long-focal-length lens and a long-focal-length photosensitive assembly,
    the light steering mechanism is configured to turn light to pass through the long-focal-length lens to be received by the long-focal-length photosensitive assembly for imaging,
    a height dimension of the long-focal-length camera module does not exceed 5.6 mm,
    a dimension of a photosensitive unit of a photosensitive element of the long-focal-length photosensitive assembly is A, and a diameter of an aperture of the long-focal-length lens is D, where A and D satisfy the following conditions:
    a value of a product of A and D is $\geq 4.4$, $A \geq 1.2$, and $5.3 \geq D \geq 3.76$, where the unit of A is μm and the unit of D is mm, and
    a diagonal length of a photosensitive area of the photosensitive element of the long-focal-length photosensitive assembly is reduced by reducing a number of the photosensitive units and increasing A.

12. The camera unit according to claim 11, wherein the ratio between the equivalent focal length of the long-focallength camera module and the equivalent focal length of the wide-angle camera module is not less than 5.

13. The camera unit according to claim 12, wherein
a first surface of the long-focal-length lens has a first height h, and the diagonal length of the photosensitive area of the photosensitive element of the long-focal-length photosensitive assembly is L, and
h and L respectively satisfy the following conditions:

$$5.1 \text{ mm} \geq h \geq 4.7 \text{ mm}, L \leq 5.5 \text{ mm}.$$

14. The camera unit according to claim 11, wherein a range of the equivalent focal length of the long-focal-length camera module is 80 mm~160 mm, and a range of the equivalent focal length of the wide-angle camera module is 20 mm~40 mm.

15. The camera unit according to claim 11, wherein a height dimension of the camera unit does not exceed 5.6 mm.

* * * * *